US011888967B2

(12) United States Patent
Bernat

(10) Patent No.: US 11,888,967 B2
(45) Date of Patent: *Jan. 30, 2024

(54) TECHNOLOGIES FOR DYNAMIC ACCELERATOR SELECTION

(71) Applicant: Intel Corporation, Santa Clara, CA (US)

(72) Inventor: Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 17/871,429

(22) Filed: Jul. 22, 2022

(65) Prior Publication Data
US 2023/0050698 A1   Feb. 16, 2023

Related U.S. Application Data

(63) Continuation of application No. 15/942,101, filed on Mar. 30, 2018, now Pat. No. 11,416,309.
(Continued)

(30) Foreign Application Priority Data
Aug. 30, 2017  (IN) .............................. 201741030632

(51) Int. Cl.
*H04L 41/0896*     (2022.01)
*H04L 41/5025*     (2022.01)
(Continued)

(52) U.S. Cl.
CPC ........ *H04L 9/0819* (2013.01); *B25J 15/0014* (2013.01); *G06F 1/183* (2013.01);
(Continued)

(58) Field of Classification Search
CPC .......... G06F 9/5088; G06F 9/505; G06F 9/44; G06F 9/5061; G06F 1/183; G06F 1/20;
(Continued)

(56) References Cited

U.S. PATENT DOCUMENTS 3,583,625 A     6/1971 Gero et al.
10,175,991 B2 * 1/2019 Biran .................. G06F 13/4282
(Continued)

OTHER PUBLICATIONS

Final Office Action for U.S. Appl. No. 15/942, 101, dated Jun. 4, 2021, 11 pages.
(Continued)

*Primary Examiner* — Azizul Choudhury
(74) *Attorney, Agent, or Firm* — Compass IP Law PC

(57) ABSTRACT

Technologies for dynamic accelerator selection include a compute sled. The compute sled includes a network interface controller to communicate with a remote accelerator of an accelerator sled over a network, where the network interface controller includes a local accelerator and a compute engine. The compute engine is to obtain network telemetry data indicative of a level of bandwidth saturation of the network. The compute engine is also to determine whether to accelerate a function managed by the compute sled. The compute engine is further to determine, in response to a determination to accelerate the function, whether to offload the function to the remote accelerator of the accelerator sled based on the telemetry data. Also the compute engine is to assign, in response a determination not to offload the function to the remote accelerator, the function to the local accelerator of the network interface controller.

22 Claims, 21 Drawing Sheets

Related U.S. Application Data

(60) Provisional application No. 62/584,401, filed on Nov. 10, 2017.

(51) Int. Cl.

| | | |
|---|---|---|
| *H04L 9/08* | (2006.01) | |
| *G06F 3/06* | (2006.01) | |
| *G06F 9/50* | (2006.01) | |
| *H04L 69/12* | (2022.01) | |
| *H04L 69/32* | (2022.01) | |
| *G06F 16/25* | (2019.01) | |
| *G06F 16/2453* | (2019.01) | |
| *H04L 49/9005* | (2022.01) | |
| *G11C 8/12* | (2006.01) | |
| *G11C 29/02* | (2006.01) | |
| *G06F 30/34* | (2020.01) | |
| *B25J 15/00* | (2006.01) | |
| *G06F 1/18* | (2006.01) | |
| *G06F 1/20* | (2006.01) | |
| *G06F 11/34* | (2006.01) | |
| *G06F 15/78* | (2006.01) | |
| *H04L 67/1008* | (2022.01) | |
| *H05K 7/14* | (2006.01) | |
| *H05K 7/18* | (2006.01) | |
| *H05K 7/20* | (2006.01) | |
| *H04L 67/1001* | (2022.01) | |
| *G11C 29/36* | (2006.01) | |
| *G11C 29/38* | (2006.01) | |
| *G11C 29/44* | (2006.01) | |
| *G06F 16/22* | (2019.01) | |
| *G06F 16/2455* | (2019.01) | |
| *G06F 12/02* | (2006.01) | |
| *G06F 12/14* | (2006.01) | |
| *G06F 13/16* | (2006.01) | |
| *G06F 15/173* | (2006.01) | |
| *G06F 13/40* | (2006.01) | |
| *G06F 13/42* | (2006.01) | |
| *G06F 9/448* | (2018.01) | |
| *G06F 9/28* | (2006.01) | |
| *G06F 15/16* | (2006.01) | |
| *H04L 41/0893* | (2022.01) | |
| *H04L 69/22* | (2022.01) | |
| *H04L 69/321* | (2022.01) | |
| *H04L 41/0213* | (2022.01) | |
| *H04L 41/0668* | (2022.01) | |
| *H04L 41/0677* | (2022.01) | |
| *H04L 45/28* | (2022.01) | |
| *H04L 45/7453* | (2022.01) | |
| *H04L 47/11* | (2022.01) | |
| *H04L 47/125* | (2022.01) | |
| *H04L 49/00* | (2022.01) | |
| *H04L 49/351* | (2022.01) | |
| *G06F 9/4401* | (2018.01) | |
| *G06F 9/445* | (2018.01) | |
| *G06F 12/06* | (2006.01) | |
| *G06F 16/23* | (2019.01) | |
| *G06F 16/248* | (2019.01) | |
| *G06F 16/901* | (2019.01) | |
| *G06F 16/11* | (2019.01) | |
| *G06F 9/44* | (2018.01) | |
| *G06F 9/48* | (2006.01) | |
| *G06F 21/10* | (2013.01) | |
| *G06N 3/063* | (2023.01) | |
| *G06Q 10/0631* | (2023.01) | |
| *G06Q 30/0283* | (2023.01) | |
| *H04L 41/14* | (2022.01) | |
| *H04L 41/5019* | (2022.01) | |
| *H04L 49/40* | (2022.01) | |
| *H04L 9/40* | (2022.01) | |
| *G06F 12/0802* | (2016.01) | |
| *G06F 12/1045* | (2016.01) | |

(52) U.S. Cl.
CPC ............. *G06F 1/20* (2013.01); *G06F 3/0604* (2013.01); *G06F 3/065* (2013.01); *G06F 3/0605* (2013.01); *G06F 3/067* (2013.01); *G06F 3/0611* (2013.01); *G06F 3/0613* (2013.01); *G06F 3/0629* (2013.01); *G06F 3/0631* (2013.01); *G06F 3/0632* (2013.01); *G06F 3/0644* (2013.01); *G06F 3/0647* (2013.01); *G06F 3/0659* (2013.01); *G06F 3/0673* (2013.01); *G06F 3/0683* (2013.01); *G06F 3/0685* (2013.01); *G06F 9/28* (2013.01); *G06F 9/445* (2013.01); *G06F 9/4406* (2013.01); *G06F 9/4411* (2013.01); *G06F 9/4494* (2018.02); *G06F 9/505* (2013.01); *G06F 9/5044* (2013.01); *G06F 9/5088* (2013.01); *G06F 11/3442* (2013.01); *G06F 12/023* (2013.01); *G06F 12/06* (2013.01); *G06F 12/0607* (2013.01); *G06F 12/14* (2013.01); *G06F 13/1663* (2013.01); *G06F 13/1668* (2013.01); *G06F 13/4068* (2013.01); *G06F 13/42* (2013.01); *G06F 15/161* (2013.01); *G06F 15/17331* (2013.01); *G06F 15/7807* (2013.01); *G06F 15/7867* (2013.01); *G06F 16/119* (2019.01); *G06F 16/221* (2019.01); *G06F 16/2237* (2019.01); *G06F 16/2255* (2019.01); *G06F 16/2282* (2019.01); *G06F 16/2365* (2019.01); *G06F 16/248* (2019.01); *G06F 16/2453* (2019.01); *G06F 16/2455* (2019.01); *G06F 16/24553* (2019.01); *G06F 16/25* (2019.01); *G06F 16/9014* (2019.01); *G06F 30/34* (2020.01); *G11C 8/12* (2013.01); *G11C 29/028* (2013.01); *G11C 29/36* (2013.01); *G11C 29/38* (2013.01); *G11C 29/44* (2013.01); *H04L 9/0894* (2013.01); *H04L 41/0213* (2013.01); *H04L 41/0668* (2013.01); *H04L 41/0677* (2013.01); *H04L 41/0893* (2013.01); *H04L 41/0896* (2013.01); *H04L 41/5025* (2013.01); *H04L 45/28* (2013.01); *H04L 45/7453* (2013.01); *H04L 47/11* (2013.01); *H04L 47/125* (2013.01); *H04L 49/30* (2013.01); *H04L 49/351* (2013.01); *H04L 49/9005* (2013.01); *H04L 67/1001* (2022.05); *H04L 67/1008* (2013.01); *H04L 69/12* (2013.01); *H04L 69/22* (2013.01); *H04L 69/32* (2013.01); *H04L 69/321* (2013.01); *H05K 7/1489* (2013.01); *H05K 7/18* (2013.01); *H05K 7/20209* (2013.01); *H05K 7/20736* (2013.01); *G06F 9/44* (2013.01); *G06F 9/4401* (2013.01); *G06F 9/4856* (2013.01); *G06F 9/5061* (2013.01); *G06F 12/0802* (2013.01); *G06F 12/1054* (2013.01); *G06F 12/1063* (2013.01); *G06F 13/4022* (2013.01); *G06F 15/1735* (2013.01); *G06F 21/105* (2013.01); *G06F 2200/201* (2013.01); *G06F 2201/85* (2013.01); *G06F 2209/509* (2013.01); *G06F 2212/1044* (2013.01); *G06F 2212/1052* (2013.01); *G06F 2212/601* (2013.01); *G06F 2213/0026* (2013.01); *G06F 2213/0064* (2013.01); *G06F*

*2213/3808* (2013.01); *G06N 3/063* (2013.01); *G06Q 10/0631* (2013.01); *G06Q 30/0283* (2013.01); *H04L 41/14* (2013.01); *H04L 41/5019* (2013.01); *H04L 49/40* (2013.01); *H04L 63/0428* (2013.01); *H05K 7/1498* (2013.01)

(58) Field of Classification Search
CPC ............ G06F 11/3442; G06F 15/7807; G06F 15/7867; G06F 13/4022; G06F 21/105; G06F 2200/201; G06N 3/063; G06Q 30/0283; G06Q 10/0631; H04L 41/5025; H04L 41/0896; H04L 41/14; H04L 41/5019; H04L 67/1008; H04L 49/40; H04L 63/0428; H05K 7/1489; H05K 7/18; H05K 7/20209; H05K 7/20736; H05K 7/1498; B25J 15/0014
See application file for complete search history.

(56) References Cited

U.S. PATENT DOCUMENTS 10,447,273 B1 * 10/2019 Roberts ............... G06F 15/7867
2016/0306772 A1     10/2016 Burger et al.

OTHER PUBLICATIONS

Office Action for U.S. Appl. No. 15/942, 101, dated Aug. 26, 2021, 10 pages.
Office Action for U.S. Appl. No. 15/942, 101, dated Dec. 4, 2020, 9 pages.

* cited by examiner

US 11,888,967 B2

TECHNOLOGIES FOR DYNAMIC ACCELERATOR SELECTION

CROSS-REFERENCE TO RELATED APPLICATIONS

The present application is a continuation of U.S. patent application Ser. No. 15/942,101, filed Mar. 30, 2018, which claims the benefit of Indian Provisional Patent Application No. 201741030632, filed Aug. 30, 2017 and U.S. Provisional Patent Application No. 62/584,401, filed Nov. 10, 2017. The entire specifications of which are hereby incorporated herein by reference in their entirety.

BACKGROUND

In a typical cloud-based computing environment (e.g., a data center), multiple compute nodes may execute workloads (e.g., processes, applications, services, etc.) on behalf of customers. One or more of the workloads may include sets of functions (e.g., jobs), that may be accelerated using accelerator resources such as field programmable gate arrays (FPGAs), dedicated graphics processors, or other specialized devices for accelerating specific types of jobs. In some data centers, all or a subset of the compute nodes may be physically equipped (e.g., on the same board as the central processing unit) with one or more accelerator resources. In other data centers, one or more compute nodes may be dedicated as accelerator nodes and may include multiple accelerator devices (e.g., multiple FPGAs).

In those data centers having dedicated accelerator nodes, compute nodes may be configured to transfer functions capable of being accelerated to the remote, dedicated accelerator nodes. However, depending on the present condition of the network and/or backlog of the dedicated accelerator node, the performance of the acceleration may be adversely impacted.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
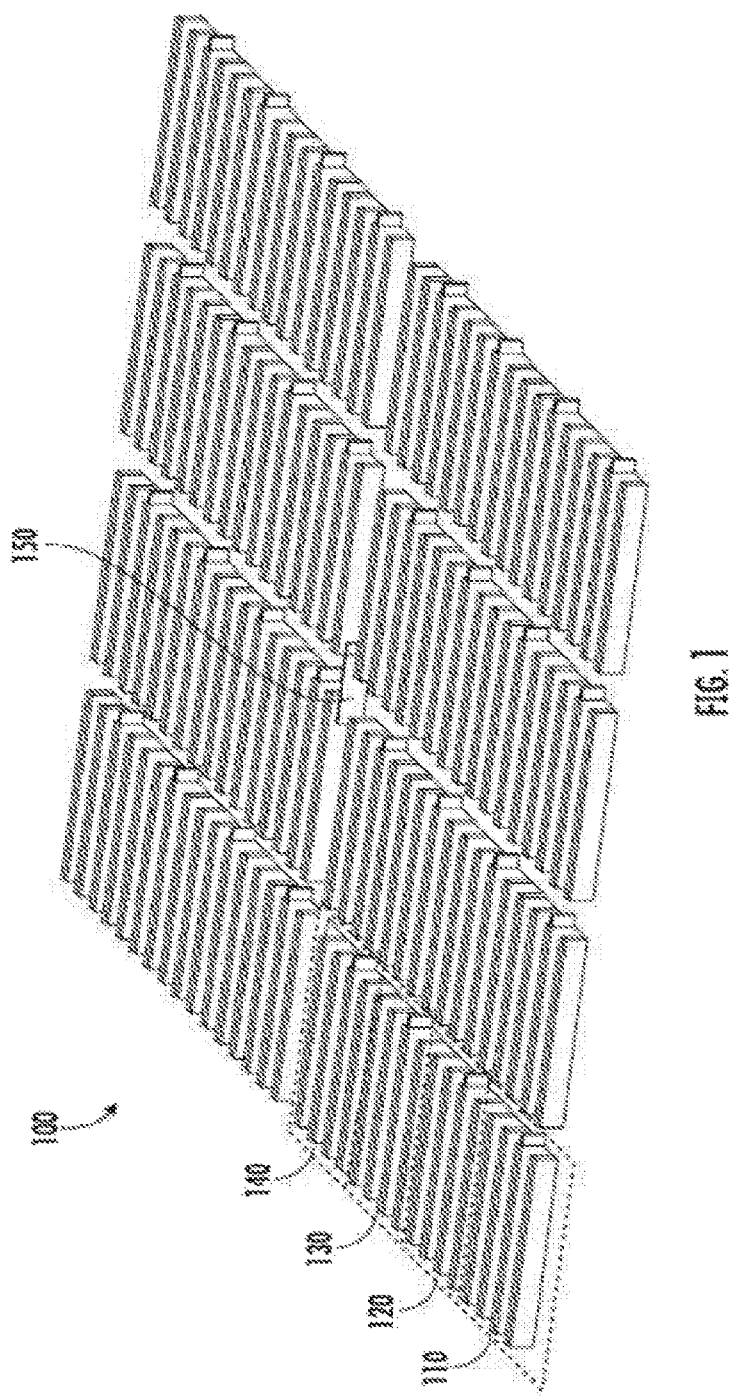
FIG. 1 is a simplified diagram of at least one embodiment of a data center for executing workloads with disaggregated resources.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a data center 100 in which disaggregated resources may cooperatively execute one or more workloads (e.g., applications on behalf of customers) includes multiple pods 110, 120, 130, 140, each of which includes one or more rows of racks. Of course, although data center 100 is shown with multiple pods, in some embodiments, the data center 100 may be embodied as a single pod. As described in more detail herein, each rack houses multiple sleds, each of which may be primarily equipped with a particular type of resource (e.g., memory devices, data storage devices, accelerator devices, general purpose processors), i.e., resources that can be logically coupled to form a composed node, which can act as, for example, a server. In the illustrative embodiment, the sleds in each pod 110, 120, 130, 140 are connected to multiple pod switches (e.g., switches that route data communications to and from sleds within the pod). The pod switches, in turn, connect with spine switches 150 that switch communications among pods (e.g., the pods 110, 120, 130, 140) in the data center 100. In some embodiments, the sleds may be connected with a fabric using Intel Omni-Path technology. In other embodiments, the sleds may be connected with other fabrics, such as InfiniBand or Ethernet. As described in more detail herein, resources within sleds in the data center 100 may be allocated to a group (referred to herein as a "managed node") containing resources from one or more sleds to be collectively utilized in the execution of a workload. The workload can execute as if the resources belonging to the managed node were located on the same sled. The resources in a managed node may belong to sleds belonging to different racks, and even to different pods 110, 120, 130, 140. As such, some resources of a single sled may be allocated to one managed node while other resources of the same sled are allocated to a different managed node (e.g., one processor assigned to one managed node and another processor of the same sled assigned to a different managed node).

A data center comprising disaggregated resources, such as data center 100, can be used in a wide variety of contexts, such as enterprise, government, cloud service provider, and communications service provider (e.g., Telco's), as well in a wide variety of sizes, from cloud service provider mega-data centers that consume over 100,000 sq. ft. to single- or multi-rack installations for use in base stations.

The disaggregation of resources to sleds comprised predominantly of a single type of resource (e.g., compute sleds comprising primarily compute resources, memory sleds containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources in a single chassis. For example, because sleds predominantly contain resources of a particular type, resources of a given type can be upgraded independently of other resources. Additionally, because different resources types (processors, storage, accelerators, etc.) typically have different refresh rates, greater resource utilization and reduced total cost of ownership may be achieved. For example, a data center operator can upgrade the processors throughout their facility by only swapping out the compute sleds. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
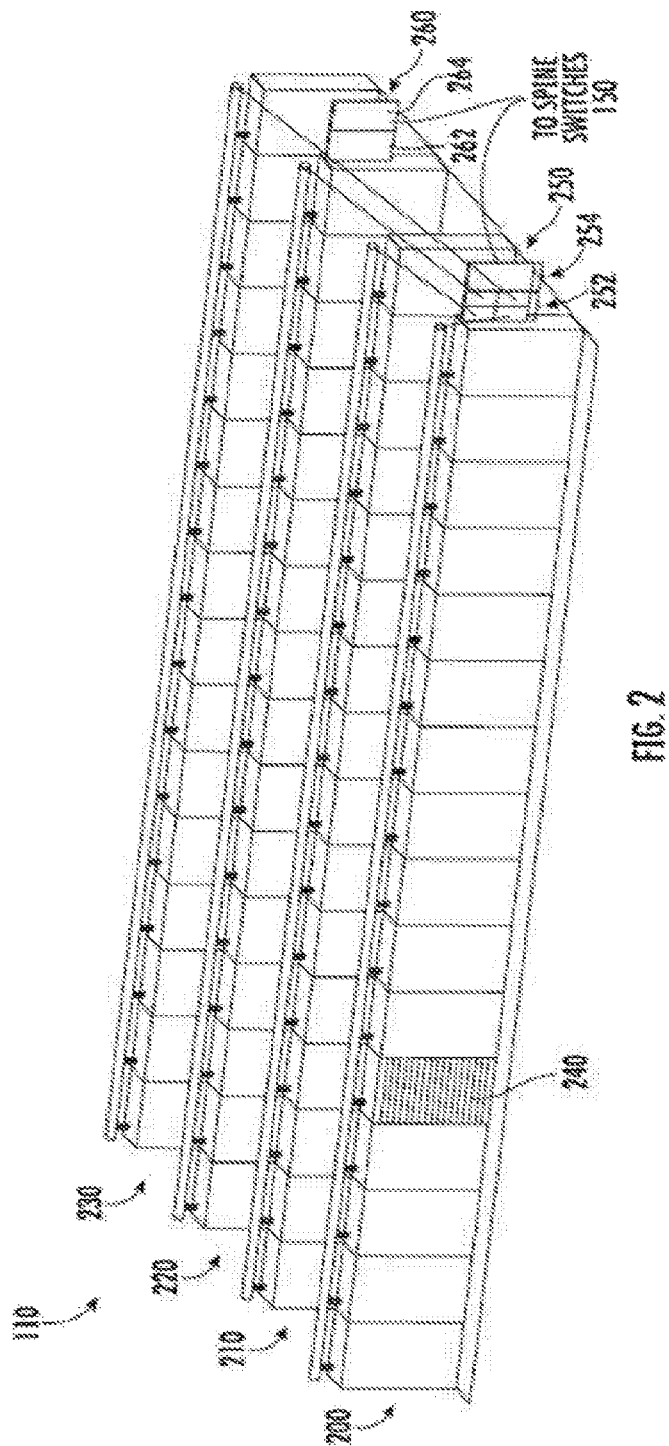
FIG. 2 is a simplified diagram of at least one embodiment of a pod that may be included in the data center of FIG. 1.

Referring now to FIG. 2, the pod 110, in the illustrative embodiment, includes a set of rows 200, 210, 220, 230 of racks 240. Each rack 240 may house multiple sleds (e.g., sixteen sleds) and provide power and data connections to the housed sleds, as described in more detail herein. In the illustrative embodiment, the racks in each row 200, 210, 220, 230 are connected to multiple pod switches 250, 260. The pod switch 250 includes a set of ports 252 to which the sleds of the racks of the pod 110 are connected and another set of ports 254 that connect the pod 110 to the spine switches 150 to provide connectivity to other pods in the data center 100. Similarly, the pod switch 260 includes a set of ports 262 to which the sleds of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the sleds in the pod 110 may still maintain data communication with the remainder of the data center 100 (e.g., sleds of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., Intel's Omni-Path Architecture's, InfiniBand, PCI Express) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple sleds as described above). Additionally, while two pod switches 250, 260 are shown, it should be understood that in other embodiments, each pod 110, 120, 130, 140 may be connected to a different number of pod switches, providing even more failover capacity. Of course, in other embodiments, pods may be arranged differently than the rows-of-racks configuration shown in FIGS. 1-2. For example, a pod may be embodied as multiple sets of racks in which each set of racks is arranged radially, i.e., the racks are equidistant from a center switch.

Figure 3:
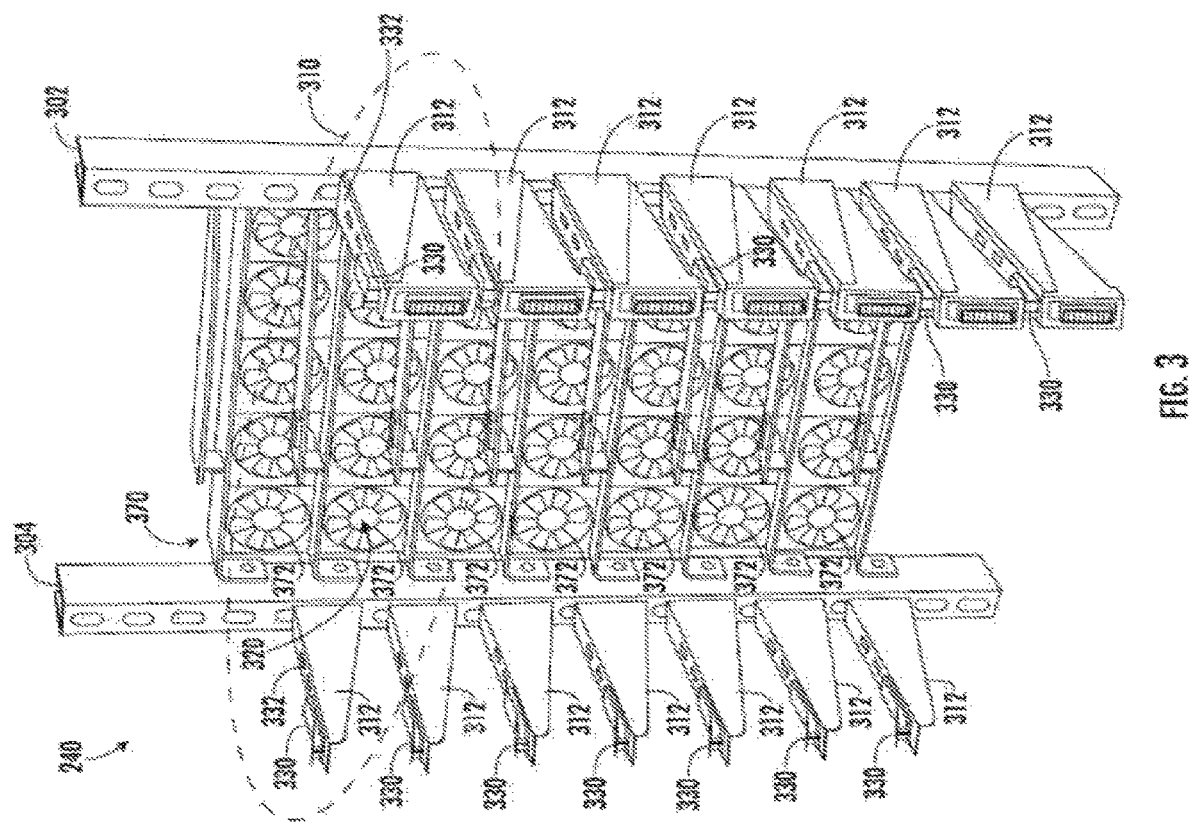
FIG. 3 is a perspective view of at least one embodiment of a rack that may be included in the pod of FIG. 2.
Figure 4:
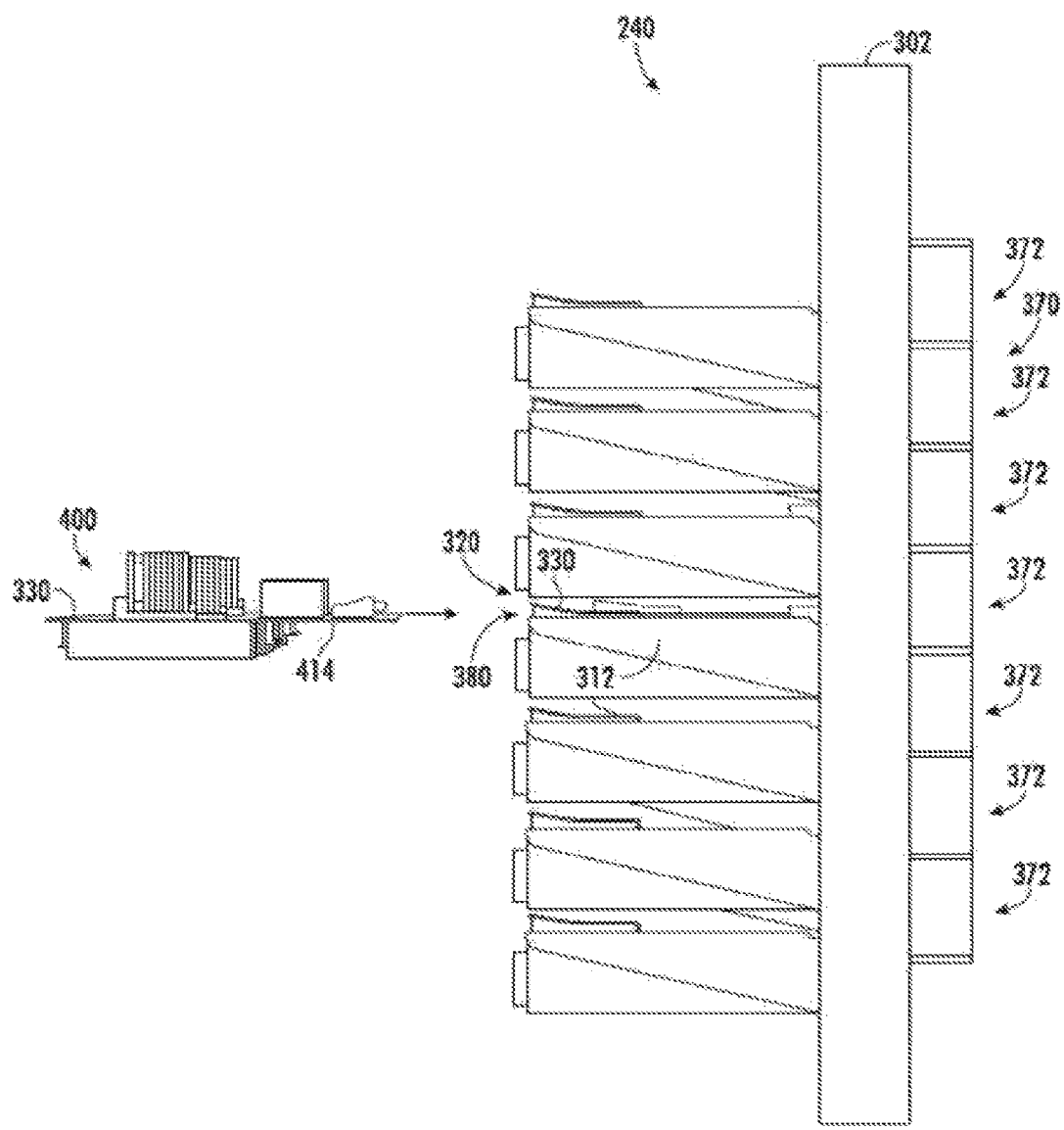
FIG. 4 is a side elevation view of the rack of FIG. 3.
Figure 5:
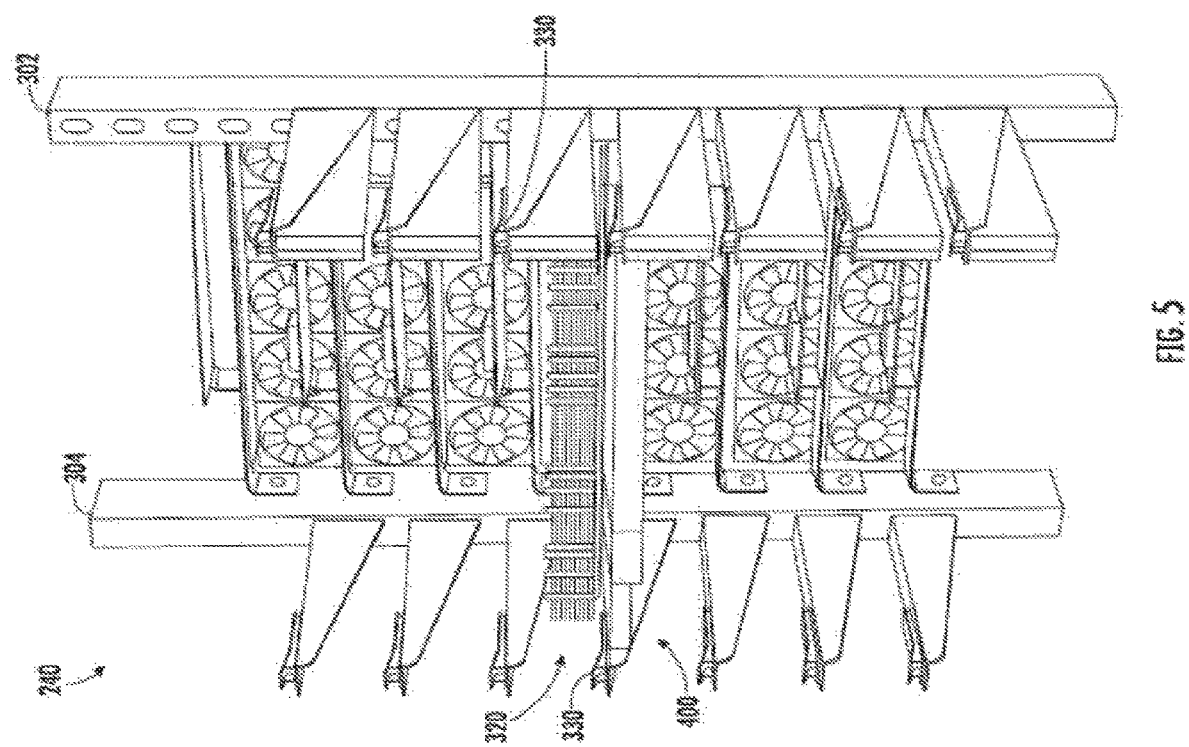
FIG. 5 is a perspective view of the rack of FIG. 3 having a sled mounted therein.

Referring now to FIGS. 3-5, each illustrative rack 240 of the data center 100 includes two elongated support posts 302, 304, which are arranged vertically. For example, the elongated support posts 302, 304 may extend upwardly from a floor of the data center 100 when deployed. The rack 240 also includes one or more horizontal pairs 310 of elongated support arms 312 (identified in FIG. 3 via a dashed ellipse) configured to support a sled of the data center 100 as discussed below. One elongated support arm 312 of the pair of elongated support arms 312 extends outwardly from the elongated support post 302 and the other elongated support arm 312 extends outwardly from the elongated support post 304.

In the illustrative embodiments, each sled of the data center 100 is embodied as a chassis-less sled. That is, each sled has a chassis-less circuit board substrate on which physical resources (e.g., processors, memory, accelerators, storage, etc.) are mounted as discussed in more detail below. As such, the rack 240 is configured to receive the chassis-less sleds. For example, each pair 310 of elongated support arms 312 defines a sled slot 320 of the rack 240, which is configured to receive a corresponding chassis-less sled. To do so, each illustrative elongated support arm 312 includes a circuit board guide 330 configured to receive the chassis-less circuit board substrate of the sled. Each circuit board guide 330 is secured to, or otherwise mounted to, a top side 332 of the corresponding elongated support arm 312. For example, in the illustrative embodiment, each circuit board guide 330 is mounted at a distal end of the corresponding elongated support arm 312 relative to the corresponding elongated support post 302, 304. For clarity of the Figures, not every circuit board guide 330 may be referenced in each Figure.

Each circuit board guide 330 includes an inner wall that defines a circuit board slot 380 configured to receive the chassis-less circuit board substrate of a sled 400 when the sled 400 is received in the corresponding sled slot 320 of the rack 240. To do so, as shown in FIG. 4, a user (or robot) aligns the chassis-less circuit board substrate of an illustrative chassis-less sled 400 to a sled slot 320. The user, or robot, may then slide the chassis-less circuit board substrate forward into the sled slot 320 such that each side edge 414 of the chassis-less circuit board substrate is received in a corresponding circuit board slot 380 of the circuit board guides 330 of the pair 310 of elongated support arms 312 that define the corresponding sled slot 320 as shown in FIG. 4. By having robotically accessible and robotically manipulable sleds comprising disaggregated resources, each type of resource can be upgraded independently of each other and at their own optimized refresh rate. Furthermore, the sleds are configured to blindly mate with power and data communication cables in each rack 240, enhancing their ability to be quickly removed, upgraded, reinstalled, and/or replaced. As such, in some embodiments, the data center 100 may operate (e.g., execute workloads, undergo maintenance and/or upgrades, etc.) without human involvement on the data center floor. In other embodiments, a human may facilitate one or more maintenance or upgrade operations in the data center 100.

It should be appreciated that each circuit board guide 330 is dual sided. That is, each circuit board guide 330 includes an inner wall that defines a circuit board slot 380 on each side of the circuit board guide 330. In this way, each circuit board guide 330 can support a chassis-less circuit board substrate on either side. As such, a single additional elongated support post may be added to the rack 240 to turn the rack 240 into a two-rack solution that can hold twice as many sled slots 320 as shown in FIG. 3. The illustrative rack 240 includes seven pairs 310 of elongated support arms 312 that define a corresponding seven sled slots 320, each configured to receive and support a corresponding sled 400 as discussed above. Of course, in other embodiments, the rack 240 may include additional or fewer pairs 310 of elongated support arms 312 (i.e., additional or fewer sled slots 320). It should be appreciated that because the sled 400 is chassis-less, the sled 400 may have an overall height that is different than typical servers. As such, in some embodiments, the height of each sled slot 320 may be shorter than the height of a typical server (e.g., shorter than a single rank unit, "1U"). That is, the vertical distance between each pair 310 of elongated support arms 312 may be less than a standard rack unit "1U." Additionally, due to the relative decrease in height of the sled slots 320, the overall height of the rack 240 in some embodiments may be shorter than the height of traditional rack enclosures. For example, in some embodiments, each of the elongated support posts 302, 304 may have a length of six feet or less. Again, in other embodiments, the rack 240 may have different dimensions. For example, in some embodiments, the vertical distance between each pair 310 of elongated support arms 312 may be greater than a standard rack until "1U". In such embodiments, the increased vertical distance between the sleds allows for larger heat sinks to be attached to the physical resources and for larger fans to be used (e.g., in the fan array 370 described below) for cooling each sled, which in turn can allow the physical resources to operate at increased power levels. Further, it should be appreciated that the rack 240 does not include any walls, enclosures, or the like. Rather, the rack 240 is an enclosure-less rack that is opened to the local environment. Of course, in some cases, an end plate may be attached to one of the elongated support posts 302, 304 in those situations in which the rack 240 forms an end-of-row rack in the data center 100.

In some embodiments, various interconnects may be routed upwardly or downwardly through the elongated support posts 302, 304. To facilitate such routing, each elongated support post 302, 304 includes an inner wall that defines an inner chamber in which interconnects may be located. The interconnects routed through the elongated support posts 302, 304 may be embodied as any type of interconnects including, but not limited to, data or communication interconnects to provide communication connections to each sled slot 320, power interconnects to provide power to each sled slot 320, and/or other types of interconnects.

The rack 240, in the illustrative embodiment, includes a support platform on which a corresponding optical data connector (not shown) is mounted. Each optical data connector is associated with a corresponding sled slot 320 and is configured to mate with an optical data connector of a corresponding sled 400 when the sled 400 is received in the corresponding sled slot 320. In some embodiments, optical connections between components (e.g., sleds, racks, and switches) in the data center 100 are made with a blind mate optical connection. For example, a door on each cable may prevent dust from contaminating the fiber inside the cable. In the process of connecting to a blind mate optical connector mechanism, the door is pushed open when the end of the cable approaches or enters the connector mechanism. Subsequently, the optical fiber inside the cable may enter a gel within the connector mechanism and the optical fiber of one cable comes into contact with the optical fiber of another cable within the gel inside the connector mechanism.

The illustrative rack 240 also includes a fan array 370 coupled to the cross-support arms of the rack 240. The fan array 370 includes one or more rows of cooling fans 372, which are aligned in a horizontal line between the elongated support posts 302, 304. In the illustrative embodiment, the fan array 370 includes a row of cooling fans 372 for each sled slot 320 of the rack 240. As discussed above, each sled 400 does not include any on-board cooling system in the illustrative embodiment and, as such, the fan array 370 provides cooling for each sled 400 received in the rack 240. Each rack 240, in the illustrative embodiment, also includes a power supply associated with each sled slot 320. Each power supply is secured to one of the elongated support arms 312 of the pair 310 of elongated support arms 312 that define the corresponding sled slot 320. For example, the rack 240 may include a power supply coupled or secured to each elongated support arm 312 extending from the elongated support post 302. Each power supply includes a power connector configured to mate with a power connector of the sled 400 when the sled 400 is received in the corresponding sled slot 320. In the illustrative embodiment, the sled 400 does not include any on-board power supply and, as such, the power supplies provided in the rack 240 supply power to corresponding sleds 400 when mounted to the rack 240. Each power supply is configured to satisfy the power requirements for its associated sled, which can vary from sled to sled. Additionally, the power supplies provided in the rack 240 can operate independent of each other. That is, within a single rack, a first power supply providing power to a compute sled can provide power levels that are different than power levels supplied by a second power supply providing power to an accelerator sled. The power supplies may be controllable at the sled level or rack level, and may be controlled locally by components on the associated sled or remotely, such as by another sled or an orchestrator.

Figure 6:
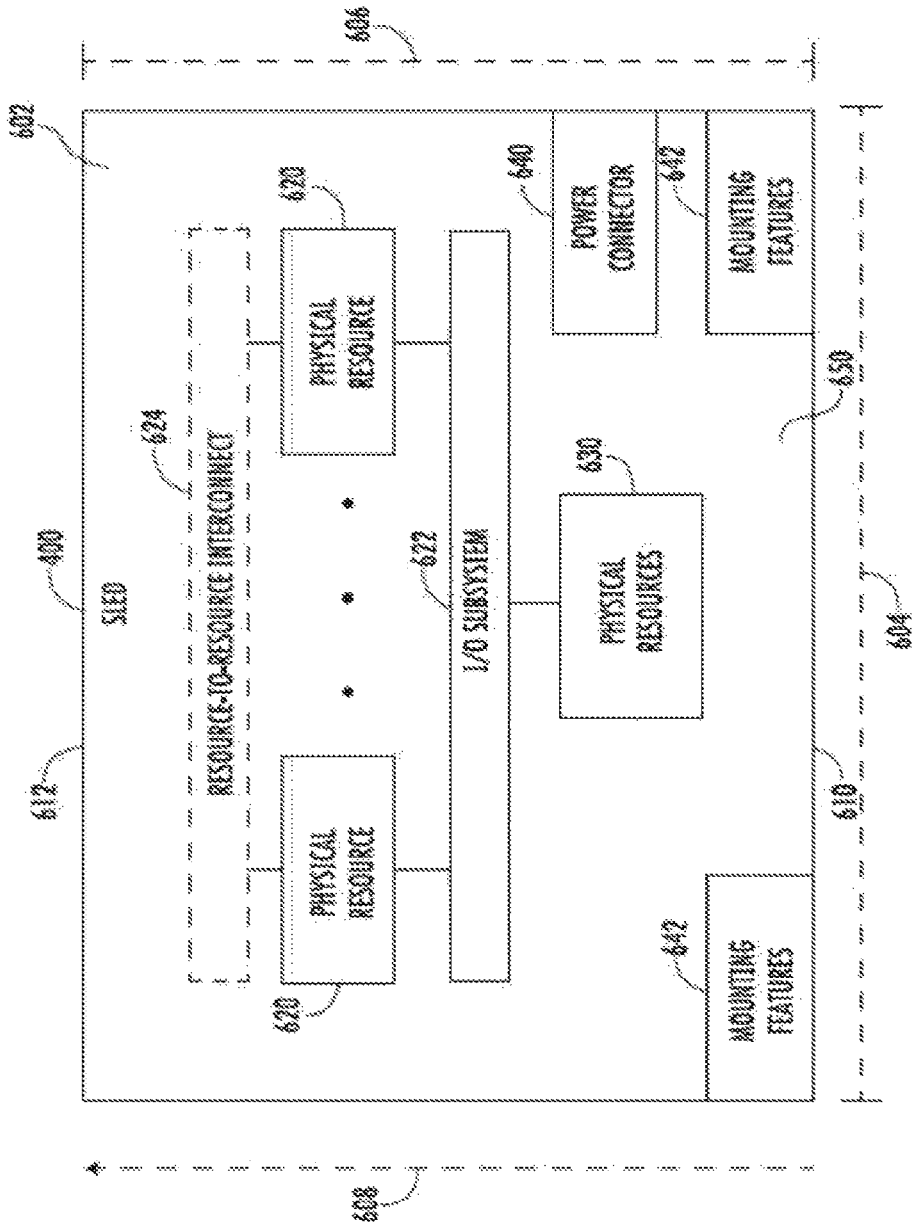
FIG. 6 is a is a simplified block diagram of at least one embodiment of a top side of the sled of FIG. 5.

Referring now to FIG. 6, the sled 400, in the illustrative embodiment, is configured to be mounted in a corresponding rack 240 of the data center 100 as discussed above. In some embodiments, each sled 400 may be optimized or otherwise configured for performing particular tasks, such as compute tasks, acceleration tasks, data storage tasks, etc. For example, the sled 400 may be embodied as a compute sled 800 as discussed below in regard to FIGS. 8-9, an accelerator sled 1000 as discussed below in regard to FIGS. 10-11, a storage sled 1200 as discussed below in regard to FIGS. 12-13, or as a sled optimized or otherwise configured to perform other specialized tasks, such as a memory sled 1400, discussed below in regard to FIG. 14.

As discussed above, the illustrative sled 400 includes a chassis-less circuit board substrate 602, which supports various physical resources (e.g., electrical components) mounted thereon. It should be appreciated that the circuit board substrate 602 is "chassis-less" in that the sled 400 does not include a housing or enclosure. Rather, the chassis-less circuit board substrate 602 is open to the local environment. The chassis-less circuit board substrate 602 may be formed from any material capable of supporting the various electrical components mounted thereon. For example, in an illustrative embodiment, the chassis-less circuit board substrate 602 is formed from an FR-4 glass-reinforced epoxy laminate material. Of course, other materials may be used to form the chassis-less circuit board substrate 602 in other embodiments.

As discussed in more detail below, the chassis-less circuit board substrate 602 includes multiple features that improve the thermal cooling characteristics of the various electrical components mounted on the chassis-less circuit board substrate 602. As discussed, the chassis-less circuit board substrate 602 does not include a housing or enclosure, which may improve the airflow over the electrical components of the sled 400 by reducing those structures that may inhibit air flow. For example, because the chassis-less circuit board substrate 602 is not positioned in an individual housing or enclosure, there is no vertically-arranged backplane (e.g., a backplate of the chassis) attached to the chassis-less circuit board substrate 602, which could inhibit air flow across the electrical components. Additionally, the chassis-less circuit board substrate 602 has a geometric shape configured to reduce the length of the airflow path across the electrical components mounted to the chassis-less circuit board substrate 602. For example, the illustrative chassis-less circuit board substrate 602 has a width 604 that is greater than a depth 606 of the chassis-less circuit board substrate 602. In one particular embodiment, for example, the chassis-less circuit board substrate 602 has a width of about 21 inches and a depth of about 9 inches, compared to a typical server that has a width of about 17 inches and a depth of about 39 inches. As such, an airflow path 608 that extends from a front edge 610 of the chassis-less circuit board substrate 602 toward a rear edge 612 has a shorter distance relative to typical servers, which may improve the thermal cooling characteristics of the sled 400. Furthermore, although not illustrated in FIG. 6, the various physical resources mounted to the chassis-less circuit board substrate 602 are mounted in corresponding locations such that no two substantively heat-producing electrical components shadow each other as discussed in more detail below. That is, no two electrical components, which produce appreciable heat during operation (i.e., greater than a nominal heat sufficient enough to adversely impact the cooling of another electrical component), are mounted to the chassis-less circuit board substrate 602 linearly in-line with each other along the direction of the airflow path 608 (i.e., along a direction extending from the front edge 610 toward the rear edge 612 of the chassis-less circuit board substrate 602).

As discussed above, the illustrative sled 400 includes one or more physical resources 620 mounted to a top side 650 of the chassis-less circuit board substrate 602. Although two physical resources 620 are shown in FIG. 6, it should be appreciated that the sled 400 may include one, two, or more physical resources 620 in other embodiments. The physical resources 620 may be embodied as any type of processor, controller, or other compute circuit capable of performing various tasks such as compute functions and/or controlling the functions of the sled 400 depending on, for example, the type or intended functionality of the sled 400. For example, as discussed in more detail below, the physical resources 620 may be embodied as high-performance processors in embodiments in which the sled 400 is embodied as a compute sled, as accelerator co-processors or circuits in embodiments in which the sled 400 is embodied as an accelerator sled, storage controllers in embodiments in which the sled 400 is embodied as a storage sled, or a set of memory devices in embodiments in which the sled 400 is embodied as a memory sled.

The sled 400 also includes one or more additional physical resources 630 mounted to the top side 650 of the chassis-less circuit board substrate 602. In the illustrative embodiment, the additional physical resources include a network interface controller (NIC) as discussed in more detail below. Of course, depending on the type and functionality of the sled 400, the physical resources 630 may include additional or other electrical components, circuits, and/or devices in other embodiments.

The physical resources 620 are communicatively coupled to the physical resources 630 via an input/output (I/O) subsystem 622. The I/O subsystem 622 may be embodied as circuitry and/or components to facilitate input/output operations with the physical resources 620, the physical resources 630, and/or other components of the sled 400. For example, the I/O subsystem 622 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative embodiment, the I/O subsystem 622 is embodied as, or otherwise includes, a double data rate 4 (DDR4) data bus or a DDR5 data bus.

In some embodiments, the sled 400 may also include a resource-to-resource interconnect 624. The resource-to-resource interconnect 624 may be embodied as any type of communication interconnect capable of facilitating resource-to-resource communications. In the illustrative embodiment, the resource-to-resource interconnect 624 is embodied as a high-speed point-to-point interconnect (e.g., faster than the I/O subsystem 622). For example, the resource-to-resource interconnect 624 may be embodied as a QuickPath Interconnect (QPI), an UltraPath Interconnect (UPI), or other high-speed point-to-point interconnect dedicated to resource-to-resource communications.

The sled 400 also includes a power connector 640 configured to mate with a corresponding power connector of the rack 240 when the sled 400 is mounted in the corresponding rack 240. The sled 400 receives power from a power supply of the rack 240 via the power connector 640 to supply power to the various electrical components of the sled 400. That is, the sled 400 does not include any local power supply (i.e., an on-board power supply) to provide power to the electrical components of the sled 400. The exclusion of a local or on-board power supply facilitates the reduction in the overall footprint of the chassis-less circuit board substrate 602, which may increase the thermal cooling characteristics of the various electrical components mounted on the chassis-less circuit board substrate 602 as discussed above. In some embodiments, voltage regulators are placed on a bottom side 750 (see FIG. 7) of the chassis-less circuit board substrate 602 directly opposite of the processors 820 (see FIG. 8), and power is routed from the voltage regulators to the processors 820 by vias extending through the circuit board substrate 602. Such a configuration provides an increased thermal budget, additional current and/or voltage, and better voltage control relative to typical printed circuit boards in which processor power is delivered from a voltage regulator, in part, by printed circuit traces.

In some embodiments, the sled 400 may also include mounting features 642 configured to mate with a mounting arm, or other structure, of a robot to facilitate the placement of the sled 600 in a rack 240 by the robot. The mounting features 642 may be embodied as any type of physical structures that allow the robot to grasp the sled 400 without damaging the chassis-less circuit board substrate 602 or the electrical components mounted thereto. For example, in some embodiments, the mounting features 642 may be embodied as non-conductive pads attached to the chassis-less circuit board substrate 602. In other embodiments, the mounting features may be embodied as brackets, braces, or other similar structures attached to the chassis-less circuit board substrate 602. The particular number, shape, size, and/or make-up of the mounting feature 642 may depend on the design of the robot configured to manage the sled 400.

Figure 7:
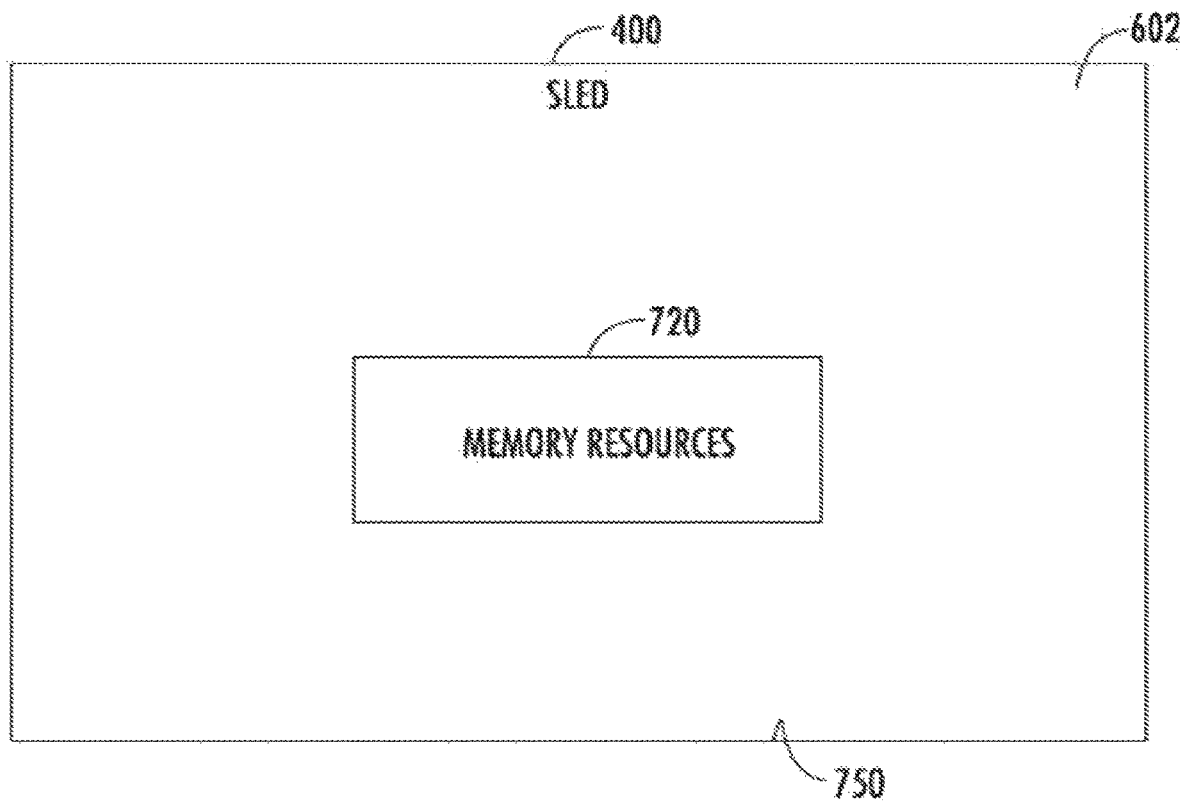
FIG. 7 is a simplified block diagram of at least one embodiment of a bottom side of the sled of FIG. 6.

Referring now to FIG. 7, in addition to the physical resources 630 mounted on the top side 650 of the chassis-less circuit board substrate 602, the sled 400 also includes one or more memory devices 720 mounted to a bottom side 750 of the chassis-less circuit board substrate 602. That is, the chassis-less circuit board substrate 602 is embodied as a double-sided circuit board. The physical resources 620 are communicatively coupled to the memory devices 720 via the I/O subsystem 622. For example, the physical resources 620 and the memory devices 720 may be communicatively coupled by one or more vias extending through the chassis-less circuit board substrate 602. Each physical resource 620 may be communicatively coupled to a different set of one or more memory devices 720 in some embodiments. Alternatively, in other embodiments, each physical resource 620 may be communicatively coupled to each memory device 720.

The memory devices 720 may be embodied as any type of memory device capable of storing data for the physical resources 620 during operation of the sled 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include next-generation nonvolatile devices, such as Intel 3D XPoint™ memory or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 8:
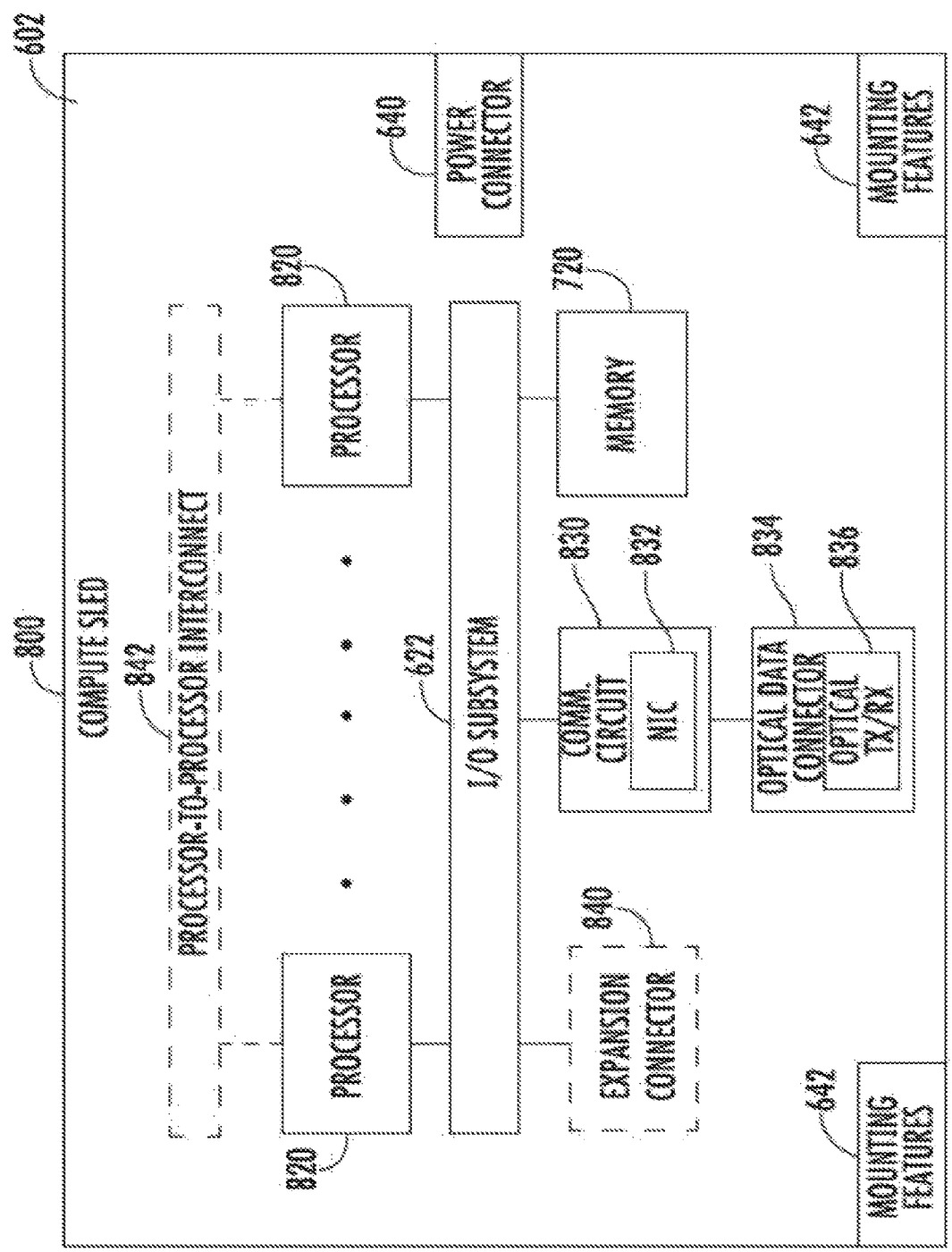
FIG. 8 is a simplified block diagram of at least one embodiment of a compute sled usable in the data center of FIG. 1.

Referring now to FIG. 8, in some embodiments, the sled 400 may be embodied as a compute sled 800. The compute sled 800 is optimized, or otherwise configured, to perform compute tasks. Of course, as discussed above, the compute sled 800 may rely on other sleds, such as acceleration sleds and/or storage sleds, to perform such compute tasks. The compute sled 800 includes various physical resources (e.g., electrical components) similar to the physical resources of the sled 400, which have been identified in FIG. 8 using the same reference numbers. The description of such components provided above in regard to FIGS. 6 and 7 applies to the corresponding components of the compute sled 800 and is not repeated herein for clarity of the description of the compute sled 800.

In the illustrative compute sled 800, the physical resources 620 are embodied as processors 820. Although only two processors 820 are shown in FIG. 8, it should be appreciated that the compute sled 800 may include additional processors 820 in other embodiments. Illustratively, the processors 820 are embodied as high-performance processors 820 and may be configured to operate at a relatively high power rating. Although the processors 820 generate additional heat operating at power ratings greater than typical processors (which operate at around 155-230 W), the enhanced thermal cooling characteristics of the chassis-less circuit board substrate 602 discussed above facilitate the higher power operation. For example, in the illustrative embodiment, the processors 820 are configured to operate at a power rating of at least 250 W. In some embodiments, the processors 820 may be configured to operate at a power rating of at least 350 W.

In some embodiments, the compute sled 800 may also include a processor-to-processor interconnect 842. Similar to the resource-to-resource interconnect 624 of the sled 400 discussed above, the processor-to-processor interconnect 842 may be embodied as any type of communication interconnect capable of facilitating processor-to-processor interconnect 842 communications. In the illustrative embodiment, the processor-to-processor interconnect 842 is embodied as a high-speed point-to-point interconnect (e.g., faster than the I/O subsystem 622). For example, the processor-to-processor interconnect 842 may be embodied as a QuickPath Interconnect (QPI), an UltraPath Interconnect (UPI), or other high-speed point-to-point interconnect dedicated to processor-to-processor communications.

The compute sled 800 also includes a communication circuit 830. The illustrative communication circuit 830 includes a network interface controller (NIC) 832, which may also be referred to as a host fabric interface (HFI). The NIC 832 may be embodied as, or otherwise include, any type of integrated circuit, discrete circuits, controller chips, chipsets, add-in-boards, daughtercards, network interface cards, or other devices that may be used by the compute sled 800 to connect with another compute device (e.g., with other sleds 400). In some embodiments, the NIC 832 may be embodied as part of a system-on-a-chip (SoC) that includes one or more processors, or included on a multichip package that also contains one or more processors. In some embodiments, the NIC 832 may include a local processor (not shown) and/or a local memory (not shown) that are both local to the NIC 832. In such embodiments, the local processor of the NIC 832 may be capable of performing one or more of the functions of the processors 820. Additionally or alternatively, in such embodiments, the local memory of the NIC 832 may be integrated into one or more components of the compute sled at the board level, socket level, chip level, and/or other levels.

The communication circuit 830 is communicatively coupled to an optical data connector 834. The optical data connector 834 is configured to mate with a corresponding optical data connector of the rack 240 when the compute sled 800 is mounted in the rack 240. Illustratively, the optical data connector 834 includes a plurality of optical fibers which lead from a mating surface of the optical data connector 834 to an optical transceiver 836. The optical transceiver 836 is configured to convert incoming optical signals from the rack-side optical data connector to electrical signals and to convert electrical signals to outgoing optical signals to the rack-side optical data connector. Although shown as forming part of the optical data connector 834 in the illustrative embodiment, the optical transceiver 836 may form a portion of the communication circuit 830 in other embodiments.

In some embodiments, the compute sled 800 may also include an expansion connector 840. In such embodiments, the expansion connector 840 is configured to mate with a corresponding connector of an expansion chassis-less circuit board substrate to provide additional physical resources to the compute sled 800. The additional physical resources may be used, for example, by the processors 820 during operation of the compute sled 800. The expansion chassis-less circuit board substrate may be substantially similar to the chassis-less circuit board substrate 602 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 9:
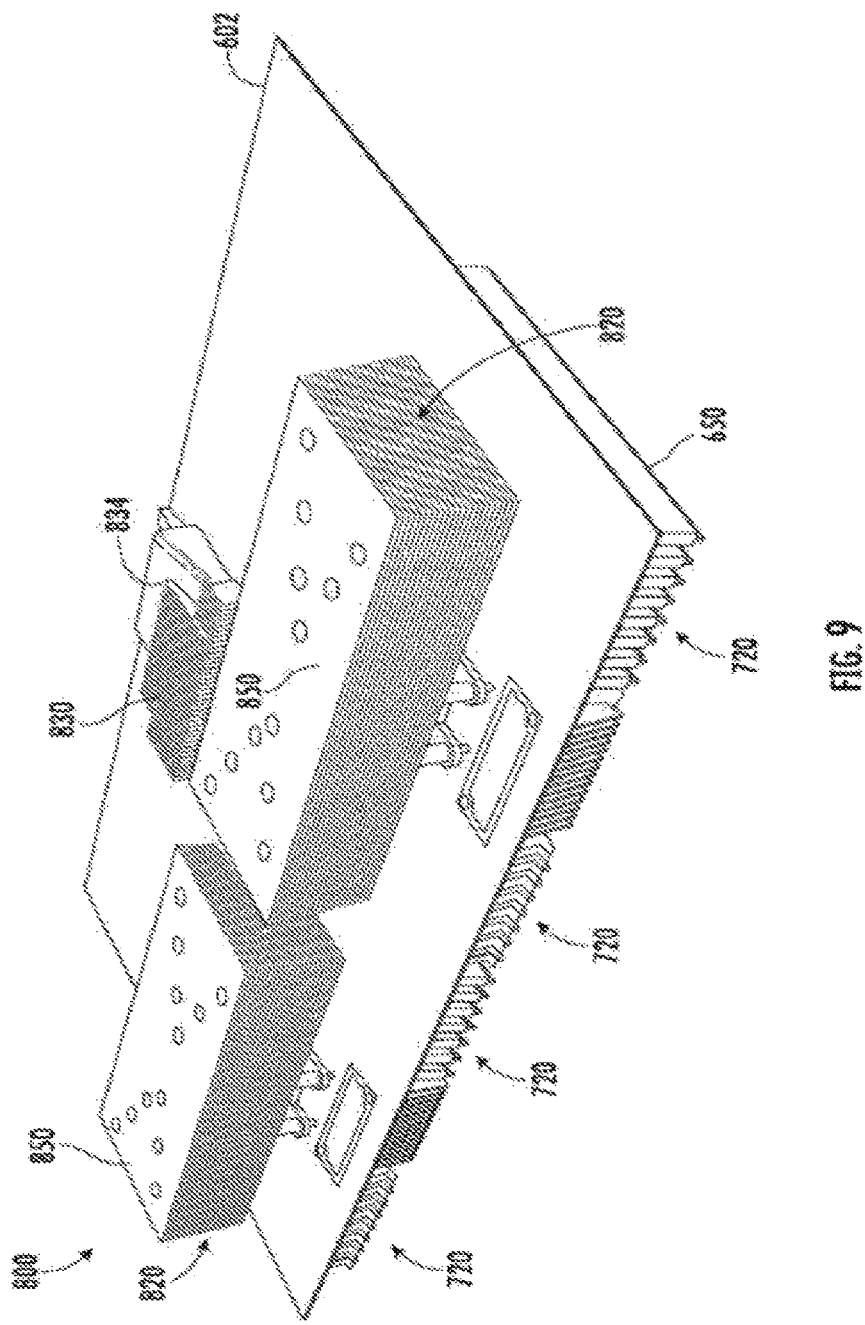
FIG. 9 is a top perspective view of at least one embodiment of the compute sled of FIG. 8.

Referring now to FIG. 9, an illustrative embodiment of the compute sled 800 is shown. As shown, the processors 820, communication circuit 830, and optical data connector 834 are mounted to the top side 650 of the chassis-less circuit board substrate 602. Any suitable attachment or mounting technology may be used to mount the physical resources of the compute sled 800 to the chassis-less circuit board substrate 602. For example, the various physical resources may be mounted in corresponding sockets (e.g., a processor socket), holders, or brackets. In some cases, some of the electrical components may be directly mounted to the chassis-less circuit board substrate 602 via soldering or similar techniques.

As discussed above, the individual processors 820 and communication circuit 830 are mounted to the top side 650 of the chassis-less circuit board substrate 602 such that no two heat-producing, electrical components shadow each other. In the illustrative embodiment, the processors 820 and communication circuit 830 are mounted in corresponding locations on the top side 650 of the chassis-less circuit board substrate 602 such that no two of those physical resources are linearly in-line with others along the direction of the airflow path 608. It should be appreciated that, although the optical data connector 834 is in-line with the communication circuit 830, the optical data connector 834 produces no or nominal heat during operation.

The memory devices 720 of the compute sled 800 are mounted to the bottom side 750 of the of the chassis-less circuit board substrate 602 as discussed above in regard to the sled 400. Although mounted to the bottom side 750, the memory devices 720 are communicatively coupled to the processors 820 located on the top side 650 via the I/O subsystem 622. Because the chassis-less circuit board substrate 602 is embodied as a double-sided circuit board, the memory devices 720 and the processors 820 may be communicatively coupled by one or more vias, connectors, or other mechanisms extending through the chassis-less circuit board substrate 602. Of course, each processor 820 may be communicatively coupled to a different set of one or more memory devices 720 in some embodiments. Alternatively, in other embodiments, each processor 820 may be communicatively coupled to each memory device 720. In some embodiments, the memory devices 720 may be mounted to one or more memory mezzanines on the bottom side of the chassis-less circuit board substrate 602 and may interconnect with a corresponding processor 820 through a ball-grid array.

Each of the processors 820 includes a heatsink 850 secured thereto. Due to the mounting of the memory devices 720 to the bottom side 750 of the chassis-less circuit board substrate 602 (as well as the vertical spacing of the sleds 400 in the corresponding rack 240), the top side 650 of the chassis-less circuit board substrate 602 includes additional "free" area or space that facilitates the use of heatsinks 850 having a larger size relative to traditional heatsinks used in typical servers. Additionally, due to the improved thermal cooling characteristics of the chassis-less circuit board substrate 602, none of the processor heatsinks 850 include cooling fans attached thereto. That is, each of the heatsinks 850 is embodied as a fan-less heatsink. In some embodiments, the heat sinks 850 mounted atop the processors 820 may overlap with the heat sink attached to the communication circuit 830 in the direction of the airflow path 608 due to their increased size, as illustratively suggested by FIG. 9.

Figure 10:
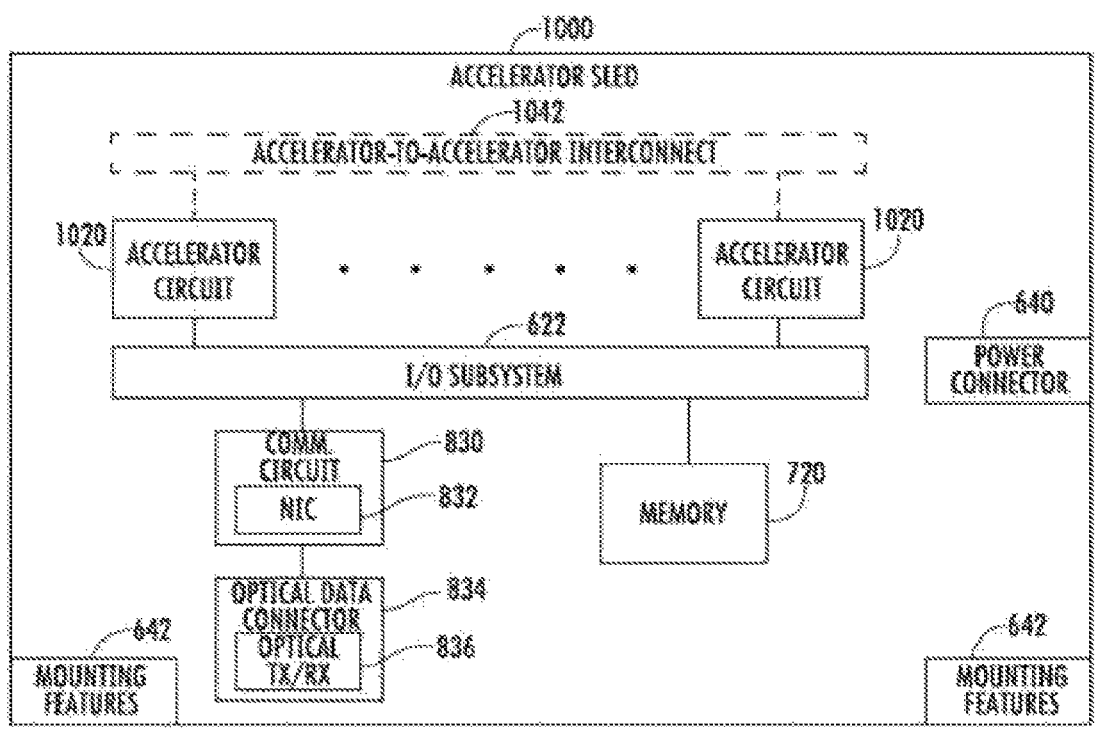
FIG. 10 is a simplified block diagram of at least one embodiment of an accelerator sled usable in the data center of FIG. 1.

Referring now to FIG. 10, in some embodiments, the sled 400 may be embodied as an accelerator sled 1000. The accelerator sled 1000 is configured, to perform specialized compute tasks, such as machine learning, encryption, hashing, or other computational-intensive task. In some embodiments, for example, a compute sled 800 may offload tasks to the accelerator sled 1000 during operation. The accelerator sled 1000 includes various components similar to components of the sled 400 and/or compute sled 800, which have been identified in FIG. 10 using the same reference numbers. The description of such components provided above in regard to FIGS. 6, 7, and 8 apply to the corresponding components of the accelerator sled 1000 and is not repeated herein for clarity of the description of the accelerator sled 1000.

Figure 11:
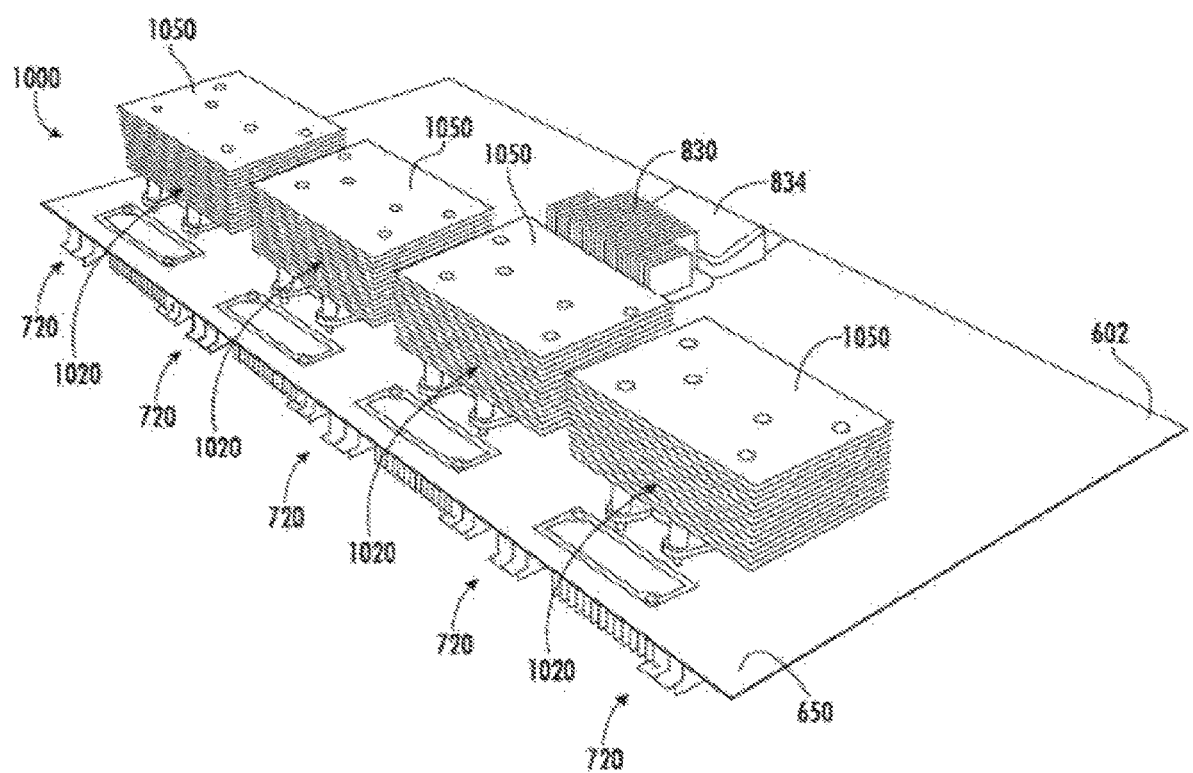
FIG. 11 is a top perspective view of at least one embodiment of the accelerator sled of FIG. 10.

In the illustrative accelerator sled 1000, the physical resources 620 are embodied as accelerator circuits 1020. Although only two accelerator circuits 1020 are shown in FIG. 10, it should be appreciated that the accelerator sled 1000 may include additional accelerator circuits 1020 in other embodiments. For example, as shown in FIG. 11, the accelerator sled 1000 may include four accelerator circuits 1020 in some embodiments. The accelerator circuits 1020 may be embodied as any type of processor, co-processor, compute circuit, or other device capable of performing compute or processing operations. For example, the accelerator circuits 1020 may be embodied as, for example, field programmable gate arrays (FPGA), application-specific integrated circuits (ASICs), security co-processors, graphics processing units (GPUs), neuromorphic processor units, quantum computers, machine learning circuits, or other specialized processors, controllers, devices, and/or circuits.

In some embodiments, the accelerator sled 1000 may also include an accelerator-to-accelerator interconnect 1042. Similar to the resource-to-resource interconnect 624 of the sled 600 discussed above, the accelerator-to-accelerator interconnect 1042 may be embodied as any type of communication interconnect capable of facilitating accelerator-to-accelerator communications. In the illustrative embodiment, the accelerator-to-accelerator interconnect 1042 is embodied as a high-speed point-to-point interconnect (e.g., faster than the I/O subsystem 622). For example, the accelerator-to-accelerator interconnect 1042 may be embodied as a QuickPath Interconnect (QPI), an UltraPath Interconnect (UPI), or other high-speed point-to-point interconnect dedicated to processor-to-processor communications. In some embodiments, the accelerator circuits 1020 may be daisy-chained with a primary accelerator circuit 1020 connected to the NIC 832 and memory 720 through the I/O subsystem 622 and a secondary accelerator circuit 1020 connected to the NIC 832 and memory 720 through a primary accelerator circuit 1020.

Referring now to FIG. 11, an illustrative embodiment of the accelerator sled 1000 is shown. As discussed above, the accelerator circuits 1020, communication circuit 830, and optical data connector 834 are mounted to the top side 650 of the chassis-less circuit board substrate 602. Again, the individual accelerator circuits 1020 and communication circuit 830 are mounted to the top side 650 of the chassis-less circuit board substrate 602 such that no two heat-producing, electrical components shadow each other as discussed above. The memory devices 720 of the accelerator sled 1000 are mounted to the bottom side 750 of the of the chassis-less circuit board substrate 602 as discussed above in regard to the sled 600. Although mounted to the bottom side 750, the memory devices 720 are communicatively coupled to the accelerator circuits 1020 located on the top side 650 via the I/O subsystem 622 (e.g., through vias). Further, each of the accelerator circuits 1020 may include a heatsink 1070 that is larger than a traditional heatsink used in a server. As discussed above with reference to the heatsinks 870, the heatsinks 1070 may be larger than traditional heatsinks because of the "free" area provided by the memory resources 720 being located on the bottom side 750 of the chassis-less circuit board substrate 602 rather than on the top side 650.

Figure 12:
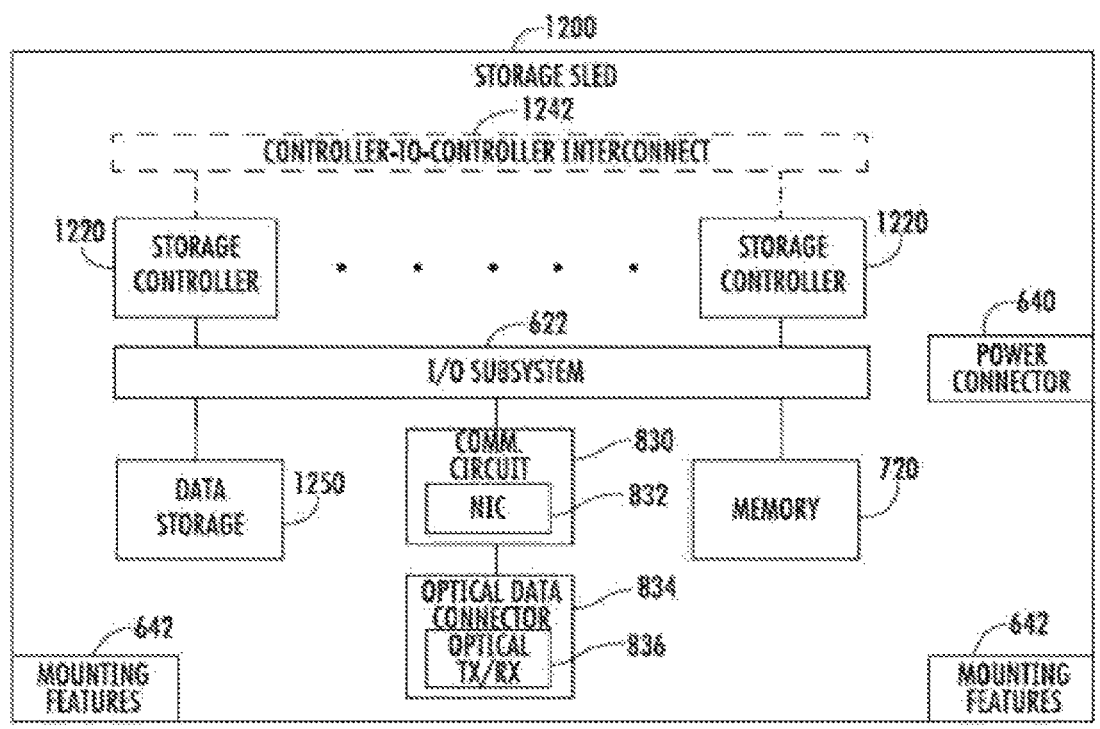
FIG. 12 is a simplified block diagram of at least one embodiment of a storage sled usable in the data center of FIG. 1.

Referring now to FIG. 12, in some embodiments, the sled 400 may be embodied as a storage sled 1200. The storage sled 1200 is configured, to store data in a data storage 1250 local to the storage sled 1200. For example, during operation, a compute sled 800 or an accelerator sled 1000 may store and retrieve data from the data storage 1250 of the storage sled 1200. The storage sled 1200 includes various components similar to components of the sled 400 and/or the compute sled 800, which have been identified in FIG. 12 using the same reference numbers. The description of such components provided above in regard to FIGS. 6, 7, and 8 apply to the corresponding components of the storage sled 1200 and is not repeated herein for clarity of the description of the storage sled 1200.

In the illustrative storage sled 1200, the physical resources 620 are embodied as storage controllers 1220. Although only two storage controllers 1220 are shown in FIG. 12, it should be appreciated that the storage sled 1200 may include additional storage controllers 1220 in other embodiments. The storage controllers 1220 may be embodied as any type of processor, controller, or control circuit capable of controlling the storage and retrieval of data into the data storage 1250 based on requests received via the communication circuit 830. In the illustrative embodiment, the storage controllers 1220 are embodied as relatively low-power processors or controllers. For example, in some embodiments, the storage controllers 1220 may be configured to operate at a power rating of about 75 watts.

In some embodiments, the storage sled 1200 may also include a controller-to-controller interconnect 1242. Similar to the resource-to-resource interconnect 624 of the sled 400 discussed above, the controller-to-controller interconnect 1242 may be embodied as any type of communication interconnect capable of facilitating controller-to-controller communications. In the illustrative embodiment, the controller-to-controller interconnect 1242 is embodied as a high-speed point-to-point interconnect (e.g., faster than the I/O subsystem 622). For example, the controller-to-controller interconnect 1242 may be embodied as a QuickPath Interconnect (QPI), an UltraPath Interconnect (UPI), or other high-speed point-to-point interconnect dedicated to processor-to-processor communications.

Figure 13:
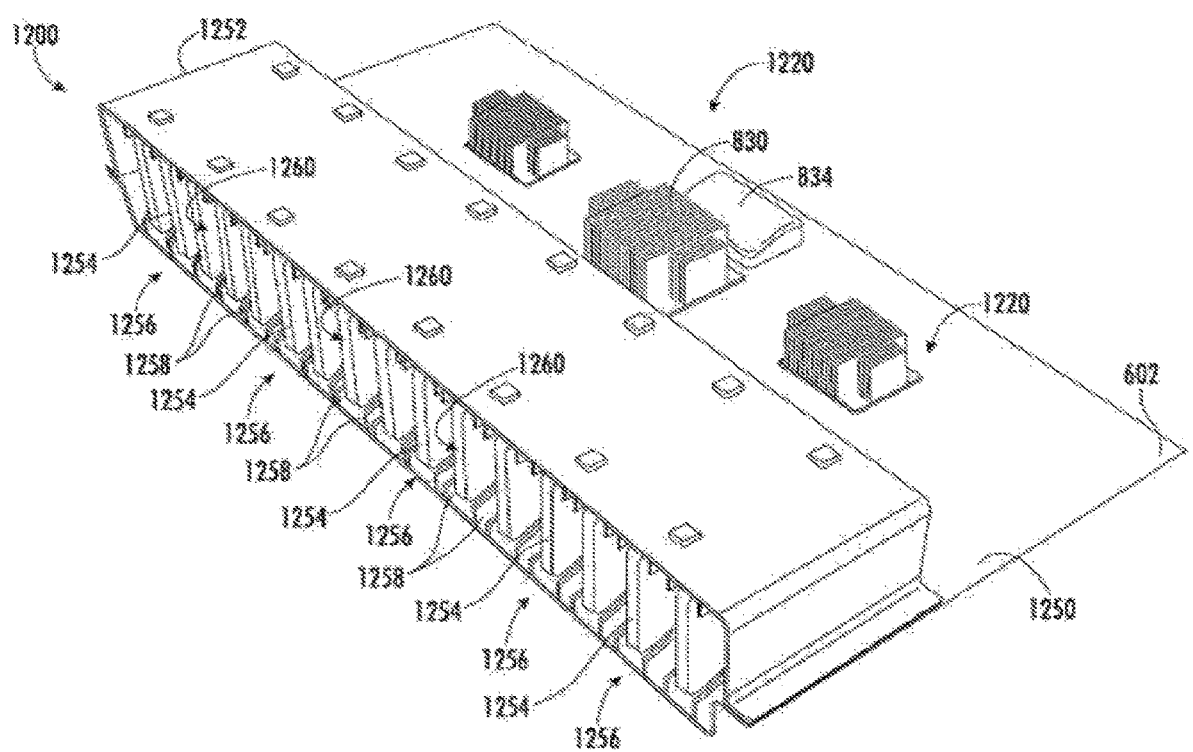
FIG. 13 is a top perspective view of at least one embodiment of the storage sled of FIG. 12.

Referring now to FIG. 13, an illustrative embodiment of the storage sled 1200 is shown. In the illustrative embodiment, the data storage 1250 is embodied as, or otherwise includes, a storage cage 1252 configured to house one or more solid state drives (SSDs) 1254. To do so, the storage cage 1252 includes a number of mounting slots 1256, each of which is configured to receive a corresponding solid state drive 1254. Each of the mounting slots 1256 includes a number of drive guides 1258 that cooperate to define an access opening 1260 of the corresponding mounting slot 1256. The storage cage 1252 is secured to the chassis-less circuit board substrate 602 such that the access openings face away from (i.e., toward the front of) the chassis-less circuit board substrate 602. As such, solid state drives 1254 are accessible while the storage sled 1200 is mounted in a corresponding rack 204. For example, a solid state drive 1254 may be swapped out of a rack 240 (e.g., via a robot) while the storage sled 1200 remains mounted in the corresponding rack 240.

The storage cage 1252 illustratively includes sixteen mounting slots 1256 and is capable of mounting and storing sixteen solid state drives 1254. Of course, the storage cage 1252 may be configured to store additional or fewer solid state drives 1254 in other embodiments. Additionally, in the illustrative embodiment, the solid state drivers are mounted vertically in the storage cage 1252, but may be mounted in the storage cage 1252 in a different orientation in other embodiments. Each solid state drive 1254 may be embodied as any type of data storage device capable of storing long term data. To do so, the solid state drives 1254 may include volatile and non-volatile memory devices discussed above.

As shown in FIG. 13, the storage controllers 1220, the communication circuit 830, and the optical data connector 834 are illustratively mounted to the top side 650 of the chassis-less circuit board substrate 602. Again, as discussed above, any suitable attachment or mounting technology may be used to mount the electrical components of the storage sled 1200 to the chassis-less circuit board substrate 602 including, for example, sockets (e.g., a processor socket), holders, brackets, soldered connections, and/or other mounting or securing techniques.

As discussed above, the individual storage controllers 1220 and the communication circuit 830 are mounted to the top side 650 of the chassis-less circuit board substrate 602 such that no two heat-producing, electrical components shadow each other. For example, the storage controllers 1220 and the communication circuit 830 are mounted in corresponding locations on the top side 650 of the chassis-less circuit board substrate 602 such that no two of those electrical components are linearly in-line with each other along the direction of the airflow path 608.

The memory devices 720 of the storage sled 1200 are mounted to the bottom side 750 of the of the chassis-less circuit board substrate 602 as discussed above in regard to the sled 400. Although mounted to the bottom side 750, the memory devices 720 are communicatively coupled to the storage controllers 1220 located on the top side 650 via the I/O subsystem 622. Again, because the chassis-less circuit board substrate 602 is embodied as a double-sided circuit board, the memory devices 720 and the storage controllers 1220 may be communicatively coupled by one or more vias, connectors, or other mechanisms extending through the chassis-less circuit board substrate 602. Each of the storage controllers 1220 includes a heatsink 1270 secured thereto. As discussed above, due to the improved thermal cooling characteristics of the chassis-less circuit board substrate 602 of the storage sled 1200, none of the heatsinks 1270 include cooling fans attached thereto. That is, each of the heatsinks 1270 is embodied as a fan-less heatsink.

Figure 14:
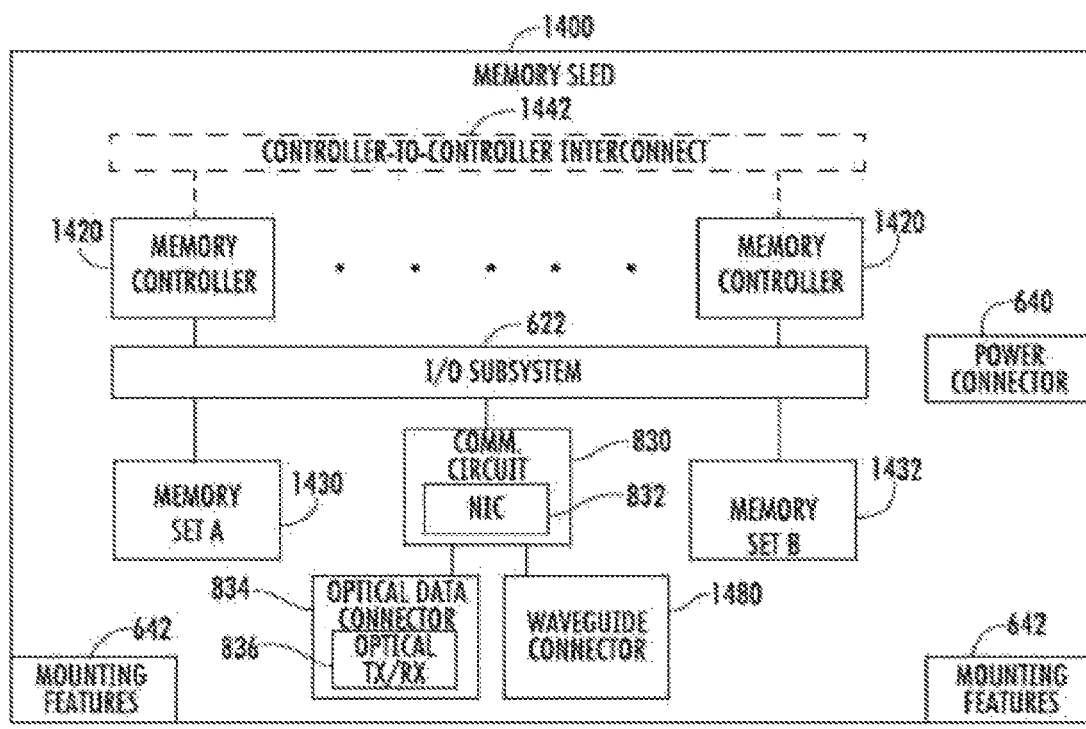
FIG. 14 is a simplified block diagram of at least one embodiment of a memory sled usable in the data center of FIG. 1.

Referring now to FIG. 14, in some embodiments, the sled 400 may be embodied as a memory sled 1400. The storage sled 1400 is optimized, or otherwise configured, to provide other sleds 400 (e.g., compute sleds 800, accelerator sleds 1000, etc.) with access to a pool of memory (e.g., in two or more sets 1430, 1432 of memory devices 720) local to the memory sled 1200. For example, during operation, a compute sled 800 or an accelerator sled 1000 may remotely write to and/or read from one or more of the memory sets 1430, 1432 of the memory sled 1200 using a logical address space that maps to physical addresses in the memory sets 1430, 1432. The memory sled 1400 includes various components similar to components of the sled 400 and/or the compute sled 800, which have been identified in FIG. 14 using the same reference numbers. The description of such components provided above in regard to FIGS. 6, 7, and 8 apply to the corresponding components of the memory sled 1400 and is not repeated herein for clarity of the description of the memory sled 1400.

In the illustrative memory sled 1400, the physical resources 620 are embodied as memory controllers 1420. Although only two memory controllers 1420 are shown in FIG. 14, it should be appreciated that the memory sled 1400 may include additional memory controllers 1420 in other embodiments. The memory controllers 1420 may be embodied as any type of processor, controller, or control circuit capable of controlling the writing and reading of data into the memory sets 1430, 1432 based on requests received via the communication circuit 830. In the illustrative embodiment, each memory controller 1420 is connected to a corresponding memory set 1430, 1432 to write to and read from memory devices 720 within the corresponding memory set 1430, 1432 and enforce any permissions (e.g., read, write, etc.) associated with sled 400 that has sent a request to the memory sled 1400 to perform a memory access operation (e.g., read or write).

In some embodiments, the memory sled 1400 may also include a controller-to-controller interconnect 1442. Similar to the resource-to-resource interconnect 624 of the sled 400 discussed above, the controller-to-controller interconnect 1442 may be embodied as any type of communication interconnect capable of facilitating controller-to-controller communications. In the illustrative embodiment, the controller-to-controller interconnect 1442 is embodied as a high-speed point-to-point interconnect (e.g., faster than the I/O subsystem 622). For example, the controller-to-controller interconnect 1442 may be embodied as a QuickPath Interconnect (QPI), an UltraPath Interconnect (UPI), or other high-speed point-to-point interconnect dedicated to processor-to-processor communications. As such, in some embodiments, a memory controller 1420 may access, through the controller-to-controller interconnect 1442, a memory that is within the memory set 1432 associated with another memory controller 1420. In some embodiments, a scalable memory controller is made of multiple smaller memory controllers, referred to herein as "chiplets", on a memory sled (e.g., the memory sled 1400). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 1420 may implement a memory interleave (e.g., one memory address is mapped to the memory set 1430, the next memory address is mapped to the memory set 1432, and the third address is mapped to the memory set 1430, etc.). The interleaving may be managed within the memory controllers 1420, or from CPU sockets (e.g., of the compute sled 800) across network links to the memory sets 1430, 1432, and may improve the latency associated with performing memory access operations as compared to accessing contiguous memory addresses from the same memory device.

Further, in some embodiments, the memory sled 1400 may be connected to one or more other sleds 400 (e.g., in the same rack 240 or an adjacent rack 240) through a waveguide, using the waveguide connector 1480. In the illustrative embodiment, the waveguides are 64 millimeter waveguides that provide 16 Rx (i.e., receive) lanes and 16 Tx (i.e., transmit) lanes. Each lane, in the illustrative embodiment, is either 16 GHz or 32 GHz. In other embodiments, the frequencies may be different. Using a waveguide may provide high throughput access to the memory pool (e.g., the memory sets 1430, 1432) to another sled (e.g., a sled 400 in the same rack 240 or an adjacent rack 240 as the memory sled 1400) without adding to the load on the optical data connector 834.

Figure 15:
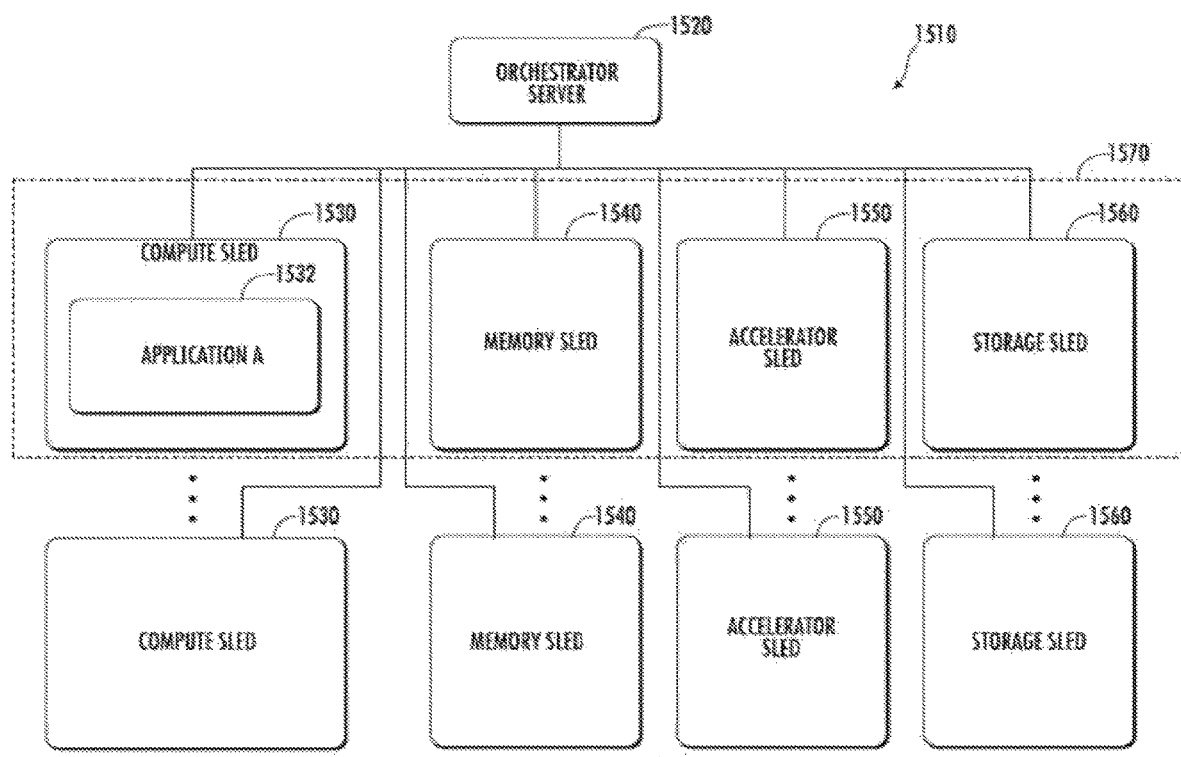
FIG. 15 is a simplified block diagram of a system that may be established within the data center of FIG. 1 to execute workloads with managed nodes composed of disaggregated resources.

Referring now to FIG. 15, a system for executing one or more workloads (e.g., applications) may be implemented in accordance with the data center 100. In the illustrative embodiment, the system 1510 includes an orchestrator server 1520, which may be embodied as a managed node comprising a compute device (e.g., a processor 820 on a compute sled 800) executing management software (e.g., a cloud operating environment, such as OpenStack) that is communicatively coupled to multiple sleds 400 including a large number of compute sleds 1530 (e.g., each similar to the compute sled 800), memory sleds 1540 (e.g., each similar to the memory sled 1400), accelerator sleds 1550 (e.g., each similar to the memory sled 1000), and storage sleds 1560 (e.g., each similar to the storage sled 1200). One or more of the sleds 1530, 1540, 1550, 1560 may be grouped into a managed node 1570, such as by the orchestrator server 1520, to collectively perform a workload (e.g., an application 1532 executed in a virtual machine or in a container). The managed node 1570 may be embodied as an assembly of physical resources 620, such as processors 820, memory resources 720, accelerator circuits 1020, or data storage 1250, from the same or different sleds 400. Further, the managed node may be established, defined, or "spun up" by the orchestrator server 1520 at the time a workload is to be assigned to the managed node or at any other time, and may exist regardless of whether any workloads are presently assigned to the managed node. In the illustrative embodiment, the orchestrator server 1520 may selectively allocate and/or deallocate physical resources 620 from the sleds 400 and/or add or remove one or more sleds 400 from the managed node 1570 as a function of quality of service (QoS) targets (e.g., performance targets associated with a throughput, latency, instructions per second, etc.) associated with a service level agreement for the workload (e.g., the application 1532). In doing so, the orchestrator server 1520 may receive telemetry data indicative of performance conditions (e.g., throughput, latency, instructions per second, etc.) in each sled 400 of the managed node 1570 and compare the telemetry data to the quality of service targets to determine whether the quality of service targets are being satisfied. The orchestrator server 1520 may additionally determine whether one or more physical resources may be deallocated from the managed node 1570 while still satisfying the QoS targets, thereby freeing up those physical resources for use in another managed node (e.g., to execute a different workload). Alternatively, if the QoS targets are not presently satisfied, the orchestrator server 1520 may determine to dynamically allocate additional physical resources to assist in the execution of the workload (e.g., the application 1532) while the workload is executing. Similarly, the orchestrator server 1520 may determine to dynamically deallocate physical resources from a managed node if the orchestrator server 1520 determines that deallocating the physical resource would result in QoS targets still being met.

Additionally, in some embodiments, the orchestrator server 1520 may identify trends in the resource utilization of the workload (e.g., the application 1532), such as by identifying phases of execution (e.g., time periods in which different operations, each having different resource utilizations characteristics, are performed) of the workload (e.g., the application 1532) and pre-emptively identifying available resources in the data center 100 and allocating them to the managed node 1570 (e.g., within a predefined time period of the associated phase beginning). In some embodiments, the orchestrator server 1520 may model performance based on various latencies and a distribution scheme to place workloads among compute sleds and other resources (e.g., accelerator sleds, memory sleds, storage sleds) in the data center 100. For example, the orchestrator server 1520 may utilize a model that accounts for the performance of resources on the sleds 400 (e.g., FPGA performance, memory access latency, etc.) and the performance (e.g., congestion, latency, bandwidth) of the path through the network to the resource (e.g., FPGA). As such, the orchestrator server 1520 may determine which resource(s) should be used with which workloads based on the total latency associated with each potential resource available in the data center 100 (e.g., the latency associated with the performance of the resource itself in addition to the latency associated with the path through the network between the compute sled executing the workload and the sled 400 on which the resource is located).

In some embodiments, the orchestrator server 1520 may generate a map of heat generation in the data center 100 using telemetry data (e.g., temperatures, fan speeds, etc.) reported from the sleds 400 and allocate resources to managed nodes as a function of the map of heat generation and predicted heat generation associated with different workloads, to maintain a target temperature and heat distribution in the data center 100. Additionally or alternatively, in some embodiments, the orchestrator server 1520 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 1520 may determine the differences based on the telemetry data stored in the hierarchical model and factor the differences into a prediction of future resource utilization of a workload if the workload is reassigned from one managed node to another managed node, to accurately balance resource utilization in the data center 100.

To reduce the computational load on the orchestrator server 1520 and the data transfer load on the network, in some embodiments, the orchestrator server 1520 may send self-test information to the sleds 400 to enable each sled 400 to locally (e.g., on the sled 400) determine whether telemetry data generated by the sled 400 satisfies one or more conditions (e.g., an available capacity that satisfies a predefined threshold, a temperature that satisfies a predefined threshold, etc.). Each sled 400 may then report back a simplified result (e.g., yes or no) to the orchestrator server 1520, which the orchestrator server 1520 may utilize in determining the allocation of resources to managed nodes.

Figure 16:
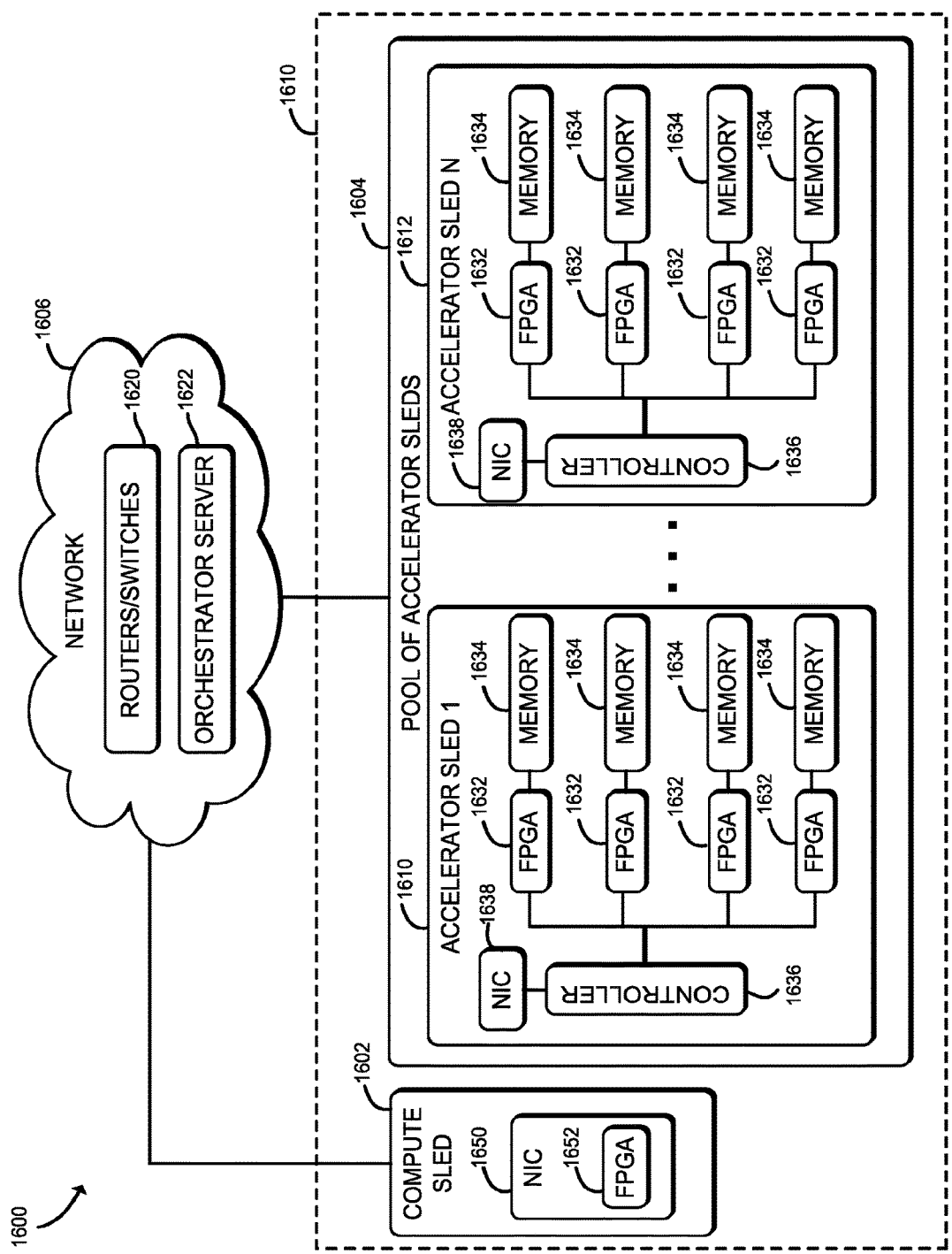
FIG. 16 is a simplified block diagram of at least one embodiment of a system for dynamic accelerator selection.

Referring now to FIG. 16, a system 1600 for dynamic accelerator selection may be implemented in accordance with the data centers 100 described above with reference to FIGS. 1, 2, 8, 10, 12, 14 and 15. In the illustrative embodiment, the system 1600 includes a compute sled 1602 configured to execute various workloads and a pool of accelerator sleds 1604, which are communicatively coupled together via a network 1606. Illustratively, the pool of accelerator sleds 1604 includes two accelerator sleds 1610, 1612, but may include additional or fewer accelerator sleds in other embodiments. As discussed in more detail below, each accelerator sled 1610, 1612 includes multiple accelerator devices 1632 (illustratively embodied as a field programmable gate arrays (FPGAs)), which are capable of accelerating the execution of functions provided thereto.

In use, the compute sled 1602 is configured to execute various workloads, which may include one or more functions that may be accelerated (e.g., graphics processing function, a complex mathematical calculation, etc.). That is, the execution of particular functions of a workload may be improved (e.g., accelerated) by offloading that particular function to an accelerator, which may be specially configured (e.g., programmed) or designed to efficiently execute those functions. Under normal operating conditions, the compute sled 1602 is configured to offload accelerated functions to one or more accelerators 1632 of one or more accelerator sleds 1610, 1612 (sometimes referred to herein as a "remote accelerator"). However, under some operating conditions, the compute sled 1602 may determine to assign or offload the accelerated function to an accelerator device 1652 (also illustratively embodied as a FPGA) of a network interface controller (NIC) 1650 of the compute sled 1602 itself (sometimes referred to herein as a "local accelerator"). For example, if the compute sled 1602 (e.g., the NIC 1650) determines that the network 1606 is saturated, that the NIC 1650 of the sled 102 or the NICs 1638 of the accelerator sleds 1610, 1612 are saturated, and/or that the resources of the accelerator sled 1610, 1612 are overloaded, the compute sled 1602 (e.g., the NIC 1650) may determine to keep the acceleration of the function local by assigning the function to the local accelerator device 1652. Additionally or alternatively, the compute sled 1602 may make such dynamic accelerator selection based on requirements of the accelerated function (e.g., whether the function requires coherent memory or has demanding service level agreement (SLA)). Furthermore, in some embodiments, the compute sled 1602 may determine whether to assign the accelerated function to the local accelerator device 1652 based on the present operation characteristics of components of the sled 1602 itself. For example, as discussed in more detail below, the compute sled 1602 may determine to assign the accelerated function to the local accelerator device 1652 if the workload of a processor of the sled 1602 is minimal, which may allow the compute sled to increase the power envelope of the local accelerator 1652 to further improve the performance of the function acceleration.

Each accelerator sled 1610, 1612 of the pool of accelerator sleds 1604 may be embodied as any type of compute device capable of performing the functions described herein, including the acceleration of a function provided thereto. In the illustrative embodiment, each accelerator sled 1610, 1612 includes one or more "remote" accelerator devices 1632. As discussed above, the accelerator devices 1632 are illustratively embodied as FPGAs, but may be embodied as other types of accelerator devices, such as a co-processor, a graphics processor, an application specific integrated circuit (ASCI), or a specialized processor, in other embodiments. Each accelerator device 1632 is coupled to a dedicated memory 1634, which may be embodied as any type of volatile and/or non-volatile memory. Each accelerator sled 1610, 1612 also includes a controller 1636 to control the corresponding accelerator devices 1632 and the overall operation of the accelerator sled 1610, 1612. As discussed above, each accelerator sled 1610, 1612 is configured to communicate with the compute sled 1602 over the network 1606. To do so, each accelerator sled 1610, 1612 also includes a network interface controller (NIC) 1638, which may use any suitable communication protocol and/or technology to communicate with the compute sled 1602 and/or with other accelerator sleds of the pool of accelerator sleds 1604.

As discussed above, the compute sled 1602 is configured to communicate with the pool of accelerator sleds 1604 over the network 1606. The network 1606 may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

To facilitate communications between the compute sled 1602 and the accelerator sleds 1610, 1612, the illustrative network 1606 includes various routers and/or switches 1620 and/or other network equipment. Similar to a typical network, the routers and switches 1620 are configured to handle packets and other data to effect such communications.

In the illustrative embodiment, the network 1606 also includes an orchestrator server 1622. The orchestrator server 1622 may be embodied as any type of server and/or compute device capable of performing the functions described herein, including obtaining and reporting network telemetry data to the compute sled 1602. For example, in the illustrative embodiment, the orchestrator server 1622 is configured to obtain telemetry data indicative of the bandwidth saturation of the network 1606 and transmit the telemetry data to the compute sled 1602. Additionally, the orchestrator server 1622 may monitor the saturation of the NICs 1638 of the accelerator sleds 1610, 1612 and transmits data indication of such saturation to the compute sled 1602.

Furthermore, in some embodiments, the orchestrator server 1622 may be configured to group one or more of the accelerator sleds of the pool of accelerator sleds 1604 into a managed node, along with other resources, to collectively perform a workload (e.g., an accelerator function that needs to be executed for an application running on compute sled 1602). A managed node may be embodied as an assembly of resources (e.g., physical resources 206), such as compute resources (e.g., physical compute resources 205-4), memory resources (e.g., physical memory resources 205-3), storage resources (e.g., physical storage resources 205-1), or other resources (e.g., physical accelerator resources 205-2), from the same or different sleds (e.g., the sleds 204-1, 204-2, 204-3, 204-4, etc.) or racks (e.g., one or more of racks 302-1 through 302-32). Further, a managed node may be established, defined, or "spun up" by the orchestrator server 1622 at the time a workload is to be assigned to the managed node or at any other time, and may exist regardless of whether any workloads are presently assigned to the managed node.

Figure 17:
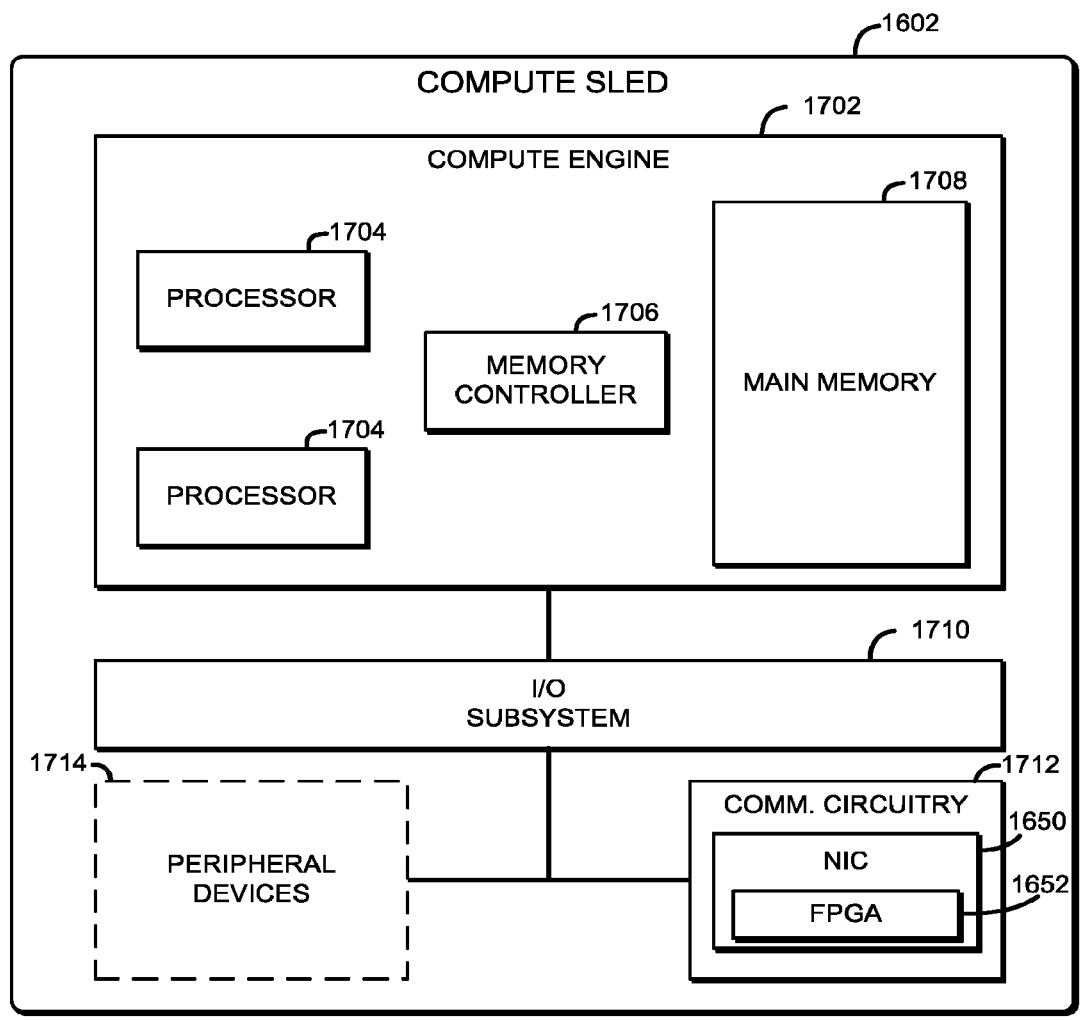
FIG. 17 is a simplified block diagram of at least one embodiment of a compute sled of the system of FIG. 16.

Referring now to FIG. 17, the compute sled 1602 may be embodied as any type of compute device or server capable of performing the functions described herein, including obtaining network telemetry data indicative of a level of bandwidth saturation of the network 1606 or the NICs 1638, 1650, determining whether to accelerate a function managed by the compute sled 1602, determining, in response to a determination to accelerate the function, whether to offload the function to a remote accelerator 1632 of an accelerator sled 1610, 1612 based on the telemetry data, and assign the function to the remote accelerator 1632 or the local accelerator 1652 based on the telemetry data and/or other criteria as discussed below. As shown in FIG. 17, the illustrative compute sled 1602 includes a compute engine 1702, an input/output (I/O) subsystem 1710, communication circuitry 1712, and one or more peripheral devices 1714. Additionally, in some embodiments, one or more of the illustrative components may be incorporated in, or otherwise form a portion of, another component.

The compute engine 1702 may be embodied as any type of device or collection of devices capable of performing various compute functions described below. In some embodiments, the compute engine 1702 may be embodied as a single device such as an integrated circuit, an embedded system, a field-programmable gate array (FPGA), a system-on-a-chip (SOC), or other integrated system or device. In the illustrative embodiment, the compute engine 1702 includes or is embodied as one or more processors 1704, a memory controller 1706, and a main memory 1708. The one or more processors 1704 may be embodied as any type of processor capable of performing the functions described herein. For example, the processors 1704 may be embodied as a microcontroller, a single or multi-core processor(s), or other processor or processing/controlling circuit. In some embodiments, the processors 1704 may be embodied as, include, or be coupled to an FPGA, an application specific integrated circuit (ASIC), a graphics processing unit, reconfigurable hardware or hardware circuitry, or other specialized hardware to facilitate performance of the functions described herein. Although the illustrative compute engine 1702 is shown as including two processors 1704, it should be appreciated that the compute engine 1702 may include additional or few processors 1704 in other embodiments.

The memory 1708 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include future generation nonvolatile devices, such as a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 1708 may be integrated into the processors 1704. In operation, the memory 1708 may store various software and data used during operation such as accelerator function data, accelerator resource data, telemetry data, applications, programs, and libraries.

The compute engine 1702 is communicatively coupled to other components of the compute sled 1602 via the I/O subsystem 1710, which may be embodied as circuitry and/or components to facilitate input/output operations with the compute engine 1702 (e.g., with the processors 1704 and/or the memory 1708) and other components of the compute sled 1602. For example, the I/O subsystem 1710 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1710 may form a portion of a system-on-a-chip (SoC) and be incorporated, along with one or more of the processors 1704, the memory 1708, and other components of the compute sled 1602, into the compute engine 1702.

The communication circuitry 1712 may be embodied as any communication circuit, device, or collection thereof, capable of enabling communications over the network 1606 between the compute sled 1602 and another compute device (e.g., the accelerator sleds 1610, 1612, the orchestrator server 1622, etc.). The communication circuitry 1712 may be configured to use any one or more communication technology (e.g., wired or wireless communications) and associated protocols (e.g., Ethernet, Bluetooth®, Wi-Fi®, WiMAX, etc.) to effect such communication.

In the illustrative embodiment, the communication circuitry 1712 includes the NIC 1650, which may also be referred to as a host fabric interface (HFI). The NIC 1650 may be embodied as one or more add-in-boards, daughter cards, network interface cards, controller chips, chipsets, or other devices that may be used by the compute sled 1602 to connect with another compute device (e.g., an accelerator sled 1610, 1612, the orchestrator server 1622, etc.). In the illustrative embodiment, the NIC 1650 includes the local accelerator 1652, which is illustrative embodied as an FPGA as shown. In some embodiments, the NIC 1650 is configured to determine whether an application on the compute sled 1602 is sending a request for accelerator function processing. If so, the NIC 1650 may obtain telemetry data from the orchestrator server 1622 and determine whether a network connection from the compute sled 1602 to the accelerator sleds 1610, 1612 is growing saturated. The NIC 1650 may determine whether to offload the accelerator function to a remote accelerator 1632 (or a group of remote accelerators 1632) or the local accelerator 1652 as discussed in more detail below. In other embodiments, such data collection and determination may be performed by the compute engine 1702.

Figure 18:
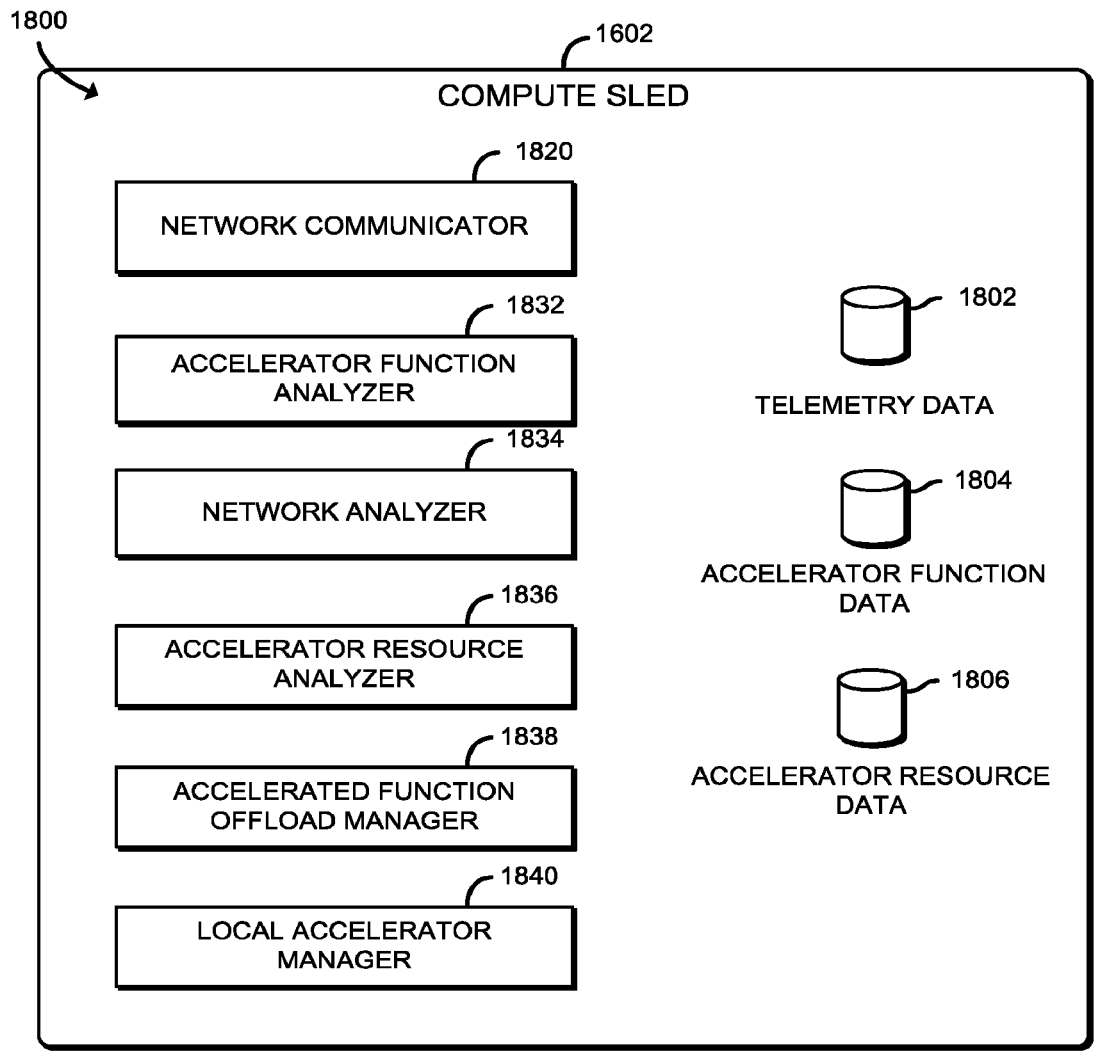
FIG. 18 is a simplified block diagram of at least one embodiment of an environment that may be established by the compute sled of FIGS. 16 and 17.

Referring now to FIG. 18, the compute sled 1602 (e.g., the NIC 1650 of the compute sled 1602) may establish an environment 1800 during operation. The illustrative environment 1800 includes a network communicator 1820, an accelerator function analyzer 1832, a network analyzer 1834, an accelerator resource analyzer 1836, an accelerator function offload manager 1838, and a local accelerator manager 1840. Each of the components of the environment 1800 may be embodied as hardware, firmware, software, or a combination thereof. In the illustrative embodiment, each of the components of the environment 1800 is established by the NIC 1650; however, in other embodiments, some or all of the components may be established by the compute engine 1702 of the compute sled 1602. Additionally, in some embodiments, one or more of the components of the environment 1800 may be embodied as circuitry or a collection of electrical devices (e.g., network communicator circuitry 1820, accelerator function analyzer circuitry 1832, network analyzer circuitry 1834, accelerator resource analyzer circuitry 1836, accelerator function offload manager circuitry 1838, and local accelerator manager circuitry 1840 etc.).

In the illustrative embodiment, the environment 1800 includes telemetry data 1802. The telemetry data 1802 may be embodied as any type of data indicative of available communication bandwidth between the compute sled 1602 and one or more selected accelerator sleds 1610, 1612, which may be selected to remotely accelerate a function. For example, the telemetry data may be indicative of a level of bandwidth saturation of the network 1606 (e.g., of the routers/switches 1620), of the NIC 1638 of the accelerator sleds 1610, 1612, and/or of the NIC 1650 of the compute sled 1602 itself.

In some embodiments, the orchestrator server 1622 may be configured to collect or otherwise determine the telemetry data. For example, the orchestrator server 1622 may collect data indicative of the bandwidth saturation of the various routers/switches 1620. In such embodiments, the telemetry data may be indicative of, for example, a connection speed or timing between the compute sled 1602 and the accelerator sleds 1610, 1612. Additionally or alternatively, the orchestrator server 122 may collect telemetry data from the individual accelerator sleds 1610, 1612, which may be indicative of the level of bandwidth saturation of their corresponding NIC 1638 as discussed above. To do so, the orchestrator server 1622 may infer the telemetry data based on communications to or from the corresponding accelerator sled 1610, 1612 or periodically request the telemetry data from the corresponding accelerator sled 1610, 1612. Alternatively, each accelerator sled 1610, 1612 may be configured to determine its own telemetry data and periodically update the orchestrator server 1622 with such data, which is subsequently passed on to the compute sled 1602. Of course, in other embodiments, the accelerators sleds 1610, 1612 may be configured to transmit the telemetry data indicative of the bandwidth saturation of its local NIC 1650 directly to the compute sled 1602 for consideration. The compute sled 1602 may also determine the telemetry data. For example, the compute sled 1602 (e.g., the NIC 1650) may determine the present or predicted bandwidth saturation of the local NIC 1650. Additionally, in some embodiments, the compute sled 1602 may execute its own telemetry discovery, storage, monitoring, and/or scanning functions in order to determine, for example, the bandwidth saturation of the network 1606 and/or of the NICs 1638 of the accelerator sleds 1610, 1612. As discussed below, the compute sled 1602 may process the telemetry data 1802 to determine the present or predicted future bandwidth saturation of the network 1606 and/or NICs 1638, 1650 to determine whether to offload an accelerator function to one or more of the remote accelerators 1632.

In the illustrative embodiment, the environment 1800 also includes accelerator function data 1804, which may be embodied as any type of data related to a function. For example, in the illustrative embodiment, the accelerator function data 1804 includes requirement data, which may identify various requirements to be satisfied or met during execution of the function. The accelerator function data 1804 may include, for example, parameters such as execution speed, completion timing requirements, performance requirements, reliability requirements, and/or resiliency requirements. In some embodiments, the accelerator function data 1804 may be embodied as a service level agreement (SLA) associated with the function to be accelerated, which must be satisfied during the execution of that function. The SLA may identify various quality, availability, and/or responsibility requirements that are to be met. Additionally, in some embodiments, the accelerator function data 1804 may dictate resource requirement associated with the function. For example, the accelerator function data 1804 may include memory requirements that may define whether a particular function requires certain memory parameters, such as memory coherency. Furthermore, in some embodiments, the accelerator function data 1804 may include additional data, such as metadata, related to a function. The metadata may provide an indication of whether the related function is to be or otherwise can be accelerated. For example, the metadata may define under what operating conditions the function is to be accelerated. Additionally, in some embodiments, the accelerator function data 1804 may include the functions themselves and/or work data on which the functions process. For example, the accelerator function data 1804 may include image files, cryptographic keys to be encrypted or decrypted, statistics to be processed through provided formulae or functions, data to be mined for specific search keys, data packets to be routed/switched, or the like.

Additionally, the illustrative environment 1800 includes accelerator resource data 1806. The accelerator resource data 1806 may be embodied as any data indicative the capability, capacity, saturation, or other operational parameter of the accelerators 1632, 1652. For example, the accelerator resource data 1806 may include data indicative of the present resource usage of resources (e.g., the present workload or availability of the accelerators 1632, 1652) of the accelerator sled 1610, 1612 and/or the compute sled 1602. As such, the accelerator resource data 1806 may include any data usable to determine the availability and/or effectiveness of the accelerators 1632, 1652 to accelerate a particular function.

The network communicator 1820, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the compute sled 1602. To do so, the network communicator 1820 is configured to receive and process data packets from remote compute devices (e.g., accelerator sleds 1610, 1612) and to prepare and send data packets to the remote compute devices. Accordingly, in some embodiments, at least a portion of the functionality of the network communicator 1820 may be embodied as, or otherwise established by, communication circuitry 1712, and, in the illustrative embodiment, by the NIC 1650.

The accelerator function analyzer 1832, which may be embodied as hardware, firmware, software, virtualized hardware, emulated architecture, and/or a combination thereof, is configured to analyze a function to determine whether the function can be accelerated and, if so, the requirements of that function. To do so, the accelerator function analyzer 1832 may analyze the accelerator function data 1804. As discussed above, accelerator function data 1804 may include data that identifies particular requirements of that function that are to be satisfied during execution of the function, such as speed levels, performance levels, result accuracy levels, etc. Additionally, the accelerator function analyzer 1832 may analyze any metadata and/or workload data associated with the function or included in the accelerator function data 1804 to determine whether the function can or should be accelerated. As discussed below, the analysis performed by the accelerator function analyzer 1832 is used by the accelerator function offload manager 1838 to determine whether to offload/assign the function to a remote accelerator 1632 or to the local accelerator 1652 of the NIC 1650 of the compute sled 1602.

The network analyzer 1834, which may be embodied as hardware, firmware, software, virtualized hardware, emulated architecture, and/or a combination thereof, is configured to collect and analyze the telemetry data 1802 to determine an overall level of saturation of the network 1606 and/or the NICs 1638, 1650. As discussed above, the telemetry data 1802 may be embodied as any type of data indicative of available communication bandwidth between the compute sled 1602 and the accelerator sleds 1610, 1612. The network analyzer 1834 may collect or receive the telemetry data 1802 from the orchestrator server 1622, directly from an accelerator sled 1610, 1612, and/or from the NIC 1650 (or based on analysis of the performance of the NIC 1650). Based on the analysis of the telemetry data 1802, the network analyzer 1834 may determine whether the bandwidth of the network 1606 and/or the NICS 1638, 1650 is present saturated. Additionally, in some embodiments, the network analyzer 1834 may be configured to infer or predict the bandwidth saturation of the network 1606 and/or the NICS 1638, 1650 at a future point in time based on the present telemetry data 1802. Furthermore, the network analyzer 1834 may determine or predict future outages or downtime of the network 1606 (e.g., components of the network 1606) and/or the accelerator sleds 1610, 1612 based on the telemetry data 1802 or other data (e.g., whether the network 1606 or accelerator sleds 1610, 1612 are scheduled to undergo maintenance or has encountered an unexpected slowdown, error, traffic spike, or failure). As discussed below, the analysis performed by the network analyzer 1834 is used by the accelerator function offload manager 1838 to determine whether to offload the function to a remote accelerator 1632 or to the local accelerator 1652 of the NIC 1650 of the compute sled 1602.

The accelerator resource analyzer 1836, which may be embodied as hardware, firmware, software, virtualized hardware, emulated architecture, and/or a combination thereof, is configured to determine the present or anticipated resource usage of the local accelerator 1652 and the remote accelerators 1632. To do so, the accelerator resource analyzer 1836 may analyze the accelerator resource data 1806 to determine the capability, capacity, saturation, or other operational parameter of the accelerators 1632, 1652. As discussed below, the analysis performed by the accelerator resource analyzer 1836 is used by the accelerator function offload manager 1838 to determine whether to offload/assign the function to a remote accelerator 1632 or to the local accelerator 1652 of the NIC 1650 of the compute sled 1602.

The accelerator function offload manager 1838, which may be embodied as hardware, firmware, software, virtualized hardware, emulated architecture, and/or a combination thereof, is configured to determine whether to accelerate a given function and, if so, whether to offload the accelerated function to one or more remote accelerators 1632 or to the local accelerator 1652 of the NIC 1650 of the compute sled 1602. To determine whether to accelerate a particular function, the accelerator function offload manager 1838 may analyze any aspect of the function and/or the present resources of the compute sled 1602 (e.g., the present usage or capacity of the compute engine 1702 of the compute sled 1602). In the illustrative embodiment, the accelerator function offload manager 1838 analyzes any metadata associated with the function, which may dictate whether the function is to be accelerated (e.g., under which conditions the function should be accelerated). If the accelerator function offload manager 1838 determines to accelerate a function, the accelerator function offload manager 1838 determines whether the function should be offloaded to a remote accelerator 1632 or assigned to the local accelerator 1652 based on the analysis performed by the accelerator function analyzer 1832, the network analyzer 1834, and/or the accelerator resource analyzer 1836. As such, the accelerator function offload manager 1838 may determine whether to offload the accelerated function based on whether the network and/or NICs 1638, 1650 are saturated, based on whether the resource usage of the remote accelerators 1632 is saturated, whether the local accelerator 1652 has resource bandwidth to handle the function, whether the requirements of the function can be met by execution by the remote accelerators 1632 and/or by the local accelerators 1652, etc. For example, the network analyzer 1834 may report that network congestion exceeds a network congestion maximum such that it would not be feasible or efficient to offload the function to a remote accelerator 1632. The accelerator resource analyzer 1836 may also report that the local accelerator 1652 is mostly idle and is not using a significant amount of resources. Additionally, the accelerator function analyzer 1832 may report that the local accelerator 1652 is capable of processing the particular accelerator function, (e.g., based on accelerator function requirements data). In such an embodiment, the accelerator function offload manager 1838 may resultantly determine to assign the accelerator function to the local accelerator 1652.

In a more particular example, the accelerator function offload manager 1838 may determine that the workload is small such that it can be processed by a single accelerator. This may mean that the workload does not require decomposition into small sub-loads. Accordingly, the choice may be between a single local accelerator (e.g., the local accelerator 1652) and a single remote accelerator (e.g., the remote accelerator 1632). The accelerator function offload manager 1838 may determine, in that scenario, that offloading to a remote accelerator 1632 will only add network transmission and processing overhead such that it is more efficient to have the local accelerator 1652 process the workload.

By contrast, in another example, the accelerator function offload manager 1838 may determine that network congestion is low (per the network analyzer 1834) so that it would be more efficient to offload the accelerator function to one or more remote accelerators 1632. For example, it may be that while the network latency to a local accelerator (e.g., the local accelerator 1652) is lower than that to a remote accelerator (e.g., one or more remote accelerators 1632), the overall efficiencies justify offloading the function to a remote accelerator 1632. Factors that affect that determination may include, for example, that the local accelerator 1652 can quickly become overwhelmed by the size and complexity of the workload it would have to process. Even if the local accelerator 1652 can efficiently process the workload, it may be more efficient to offload to an accelerator sled 1610, 1612 bearing multiple remote accelerators 1632. In such a scenario, the accelerator sled 1610, 1612 could complete processing of the accelerator function quickly enough as to more than compensate for any network transmission efficiencies provided by the local accelerator 1652.

In some embodiments, the accelerator function offload manager 1838 may also be configured to reassign a currently processing accelerator function from the local accelerator 1652 to one or more remote accelerators 1632 and vice versa. For example, the accelerator function offload manager 1838 may determine, after offloading, that an accelerator function is not being processed as efficiently as expected (e.g., results were not received at the expected time or an error was received). Accordingly, the accelerator function offload manager 1838 may reassign the accelerated function away from the remote accelerators 1632 and to the local accelerator 1652 until completion of processing.

The local accelerator manager 1840, which may be embodied as hardware, firmware, software, virtualized hardware, emulated architecture, and/or a combination thereof, is configured to manage the functionality of local accelerator 1652 and the acceleration of a function assigned to the local accelerator 1652. For example, the local accelerator manager 1840 may collect and/or report various accelerator resource data 1806 that identifies the current and anticipated resource usage levels for the local accelerator 1652. The local accelerator manager 1840 may also advertise the capabilities of the local accelerator 1652 in order to improve efficiency. For example, the local accelerator manager 1840 may provide, to the accelerator function offload manager 1838, data regarding the types of functions that the local accelerator 1652 can accelerate. In addition, the local accelerator manager 1840 is configured to manage power consumption for the local accelerator 1652. In one embodiment, the local accelerator manager 1840 monitors a power consumption for the local accelerator 1652 and determines whether the local accelerator 1652 could safely consume more power and thus process more accelerator functions or process functions more quickly. If so, the local accelerator manager 1840 is configure to increase the power envelope of the local accelerator 1652 in order that the local accelerator 1652 may accept a particular accelerator functions or that the local accelerator 1652 finish an existing accelerator function more quickly.

It should be appreciated that each of the network communicator 1820, the accelerator function analyzer 1832, the network analyzer 1834, the accelerator resource analyzer 1836, the accelerator function offload manager 1838, and the local accelerator manager 1840 may be separately embodied as hardware, firmware, software, virtualized hardware, emulated architecture, and/or a combination thereof. For example, the network analyzer 1834 may be embodied as a hardware component, while the accelerator function offload manager 1838, and the local accelerator manager 1840 are embodied as virtualized hardware components or as some other combination of hardware, firmware, software, virtualized hardware, emulated architecture, and/or a combination thereof.

Figure 19:
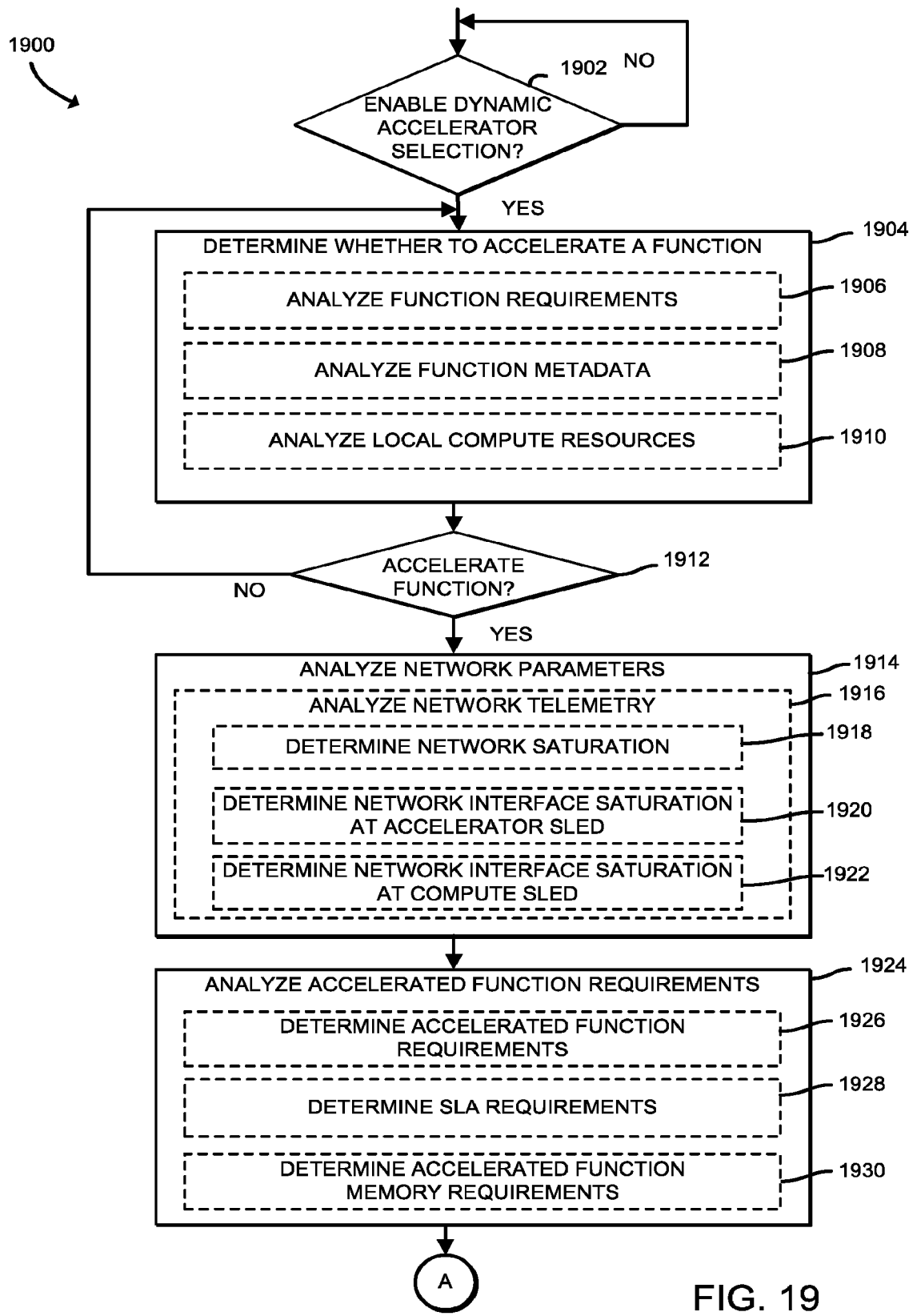
FIGS. 19-21 are simplified flow diagrams of at least one embodiment of a method for dynamic accelerator selection that may be executed by the compute sled of FIGS. 16-18.

Referring now to FIG. 19, the compute sled 1602, in operation, may execute a method 1900 for dynamic accelerator selection. It should be appreciated that, in the illustrative embodiment, the method 1900 is performed by the NIC 1650 of the compute sled 1602. However, in other embodiments, some or all of the blocks of the method 1900 may be performed or executed by other physical or virtual components, such as the compute engine 1702, of the compute sled 1602.

The method 1900 begins with block 1902, in which the compute sled 1602 determines whether to enable dynamic accelerator selection. If the compute sled 1602 determines to enable dynamic accelerator selection, the method 1900 advances to block 1904 in which the compute sled 1602 determines whether to accelerate a function. The function may form part of a workload, a larger function, or be embodied as a special function called by another program or device. To do so, the compute sled 1602 may analyze any data related to the function and/or operation of the compute sled 1602 itself and/or the accelerator sleds 1610, 1612. For example, in block 1906, the compute sled 1602 may analyze the function requirements associated with the particular function. The function requirements may form a part of the accelerator function data 1804 and may define requirements of the function (e.g., execution time, availability requirements, geographical region requirements, etc.) to be satisfied during execution of the function as discussed above. For example, the function requirements may include an SLA that must be maintained or satisfied by the execution of the function. As such, the compute sled 1602 may determine whether to accelerate the function based on such requirements (e.g., acceleration of the function may be necessary to meet the defined requirements).

Additionally or alternatively, in block 1908, the compute sled 1602 may analyze any metadata associated with the function. As discussed above, the metadata may be embodied as any type of data associated with the function that dictates or otherwise provides an indication of whether the function is to be accelerated or not accelerated. For example, in some embodiments, a function may include, or have associated therewith, metadata that indicates the function should or should not be accelerated. Additionally, the metadata may identify under what circumstances that function should be accelerated or not.

In block 1910, the compute sled 1602 may also analyze its local compute resources to determine whether to accelerate the function. For example, compute sled 1602 may determine the present level of compute resources (e.g., the availability of processors 1704 or cores of the processors 1704) local to the compute sled 1602 to execute the function. If those compute resources are not sufficient (e.g., not sufficient to achieve the requirements of the function), the compute sled 102 may determine to accelerate the function may handing the function off to the local accelerator 1652 or remote accelerator(s) 1632.

Based on the analysis of the function requirements, the metadata, local compute resources, and/or any other relevant data, the compute sled 1602 determines whether to accelerate the function in block 1912. If the compute sled 1602 determines not to accelerate the function, the method 1900 loops back to block 1904 in which the compute sled 1602 determines whether to accelerate another function. If, however, the compute sled 1602 determines to accelerate the function in block 1912, the method advances to block 1914, 1924, 1934, and 1940. Although illustrated as occurring in a particular sequential order in FIGS. 19 & 20, it should be appreciated that the blocks 1914, 1924, 1934, 1940 may be executed in any order or contemporaneously with one or more of each other. Additionally, in some embodiments, only one or some of the blocks 1914, 1924, 1934, 1940 may be executed (i.e., the determination whether to offload the function to a remote accelerator 1632 may be based off a subset of the blocks 1914, 1924, 1934, 1940 in some embodiments).

In block 1914, the compute sled 1602 analyzes network parameters to determine whether to offload the accelerator function to one or more remote accelerators 1632. To do so, the compute sled 1602 may analyze any parameter impacting or defining the bandwidth saturation or quality of communication between the compute sled 1602 and one or more accelerator sleds 1610, 1612. For example, in block 1916, the compute sled 102 may analyze the telemetry data 1802, which may be indicative of the bandwidth saturation of the network 1606, the bandwidth saturation of the NIC 1638 of an accelerator sled 1610, 1612, and/or the bandwidth saturation of the NIC 1650 of the compute sled 1602. As such, in block 1918, the compute sled 1602 may determine the network saturation of the network 1606. To do so, in some embodiments, the compute sled 1602 may receive telemetry data indicative of the network saturation of the network 1606 from the orchestrator server 1622. Additionally or alternatively, the compute sled 1606 may determine or infer the network saturation itself by, for example, sending test packets to the accelerators sled 1610, 1612. In block 1920, the compute sled 1602 may determine the network interface saturation of the NIC 1638 of an accelerator sled 1610, 1612. To do so, the compute sled 1602 may receive telemetry data indicative of the network interface saturation of the NIC(s) 1638 for the corresponding accelerator sled 1610, 1612 from the orchestrator server 1622. Additionally or alternatively, the compute sled 1606 may receive the telemetry data indicative of the network interface saturation of the NIC(s) 1638 directly from the corresponding accelerator sled 1610, 1612. In block 1922, the compute sled 1602 may also determine the network saturation of its own NIC 1650. To do so, the compute sled 1602 may monitor the operation of the NIC 1650 and/or analyze data provided by the NIC 1650 to determine the level of saturation of NIC 1650 at a particular point in time. As discussed above, the state of network saturation may be used by the compute sled 1602 to determine whether to offload the accelerator function to one or more remote accelerators 1632 or assign the accelerator function to the local accelerator 1652.

In block 1924, the compute sled 1602 analyzes function requirements of the function to be accelerated. As discussed above, the accelerator function data 1804 may include any type of data that identifies various requirements to be satisfied or met during execution of the function such as execution speed, completion timing requirements, performance requirements, reliability requirements, and/or resiliency requirements. As such, in block 1926, the compute sled 1602 may determine any associated requirements of the function to be accelerated by, for example, accessing the accelerator function data 1804 and/or analyzing metadata associated with the function. Additionally, in some embodiments in block 1928, the compute sled 1602 may determine any SLA requirements associated with the function. As discussed above, an associated SLA may identify various quality, availability, and/or responsibility requirements that are to be met during execution of that particular function. Furthermore, in some embodiments, the compute sled 1602 may determine any memory requirements of the function to be accelerated in block 1930. Such memory requirements may define any memory parameters, such as memory coherency, required by the function during execution. As discussed above, any determined accelerated function requirements may be used by the compute sled 1602 to determine whether to offload the accelerator function to one or more remote accelerators 1632 or assign the accelerator function to the local accelerator 1652.

Figure 20:
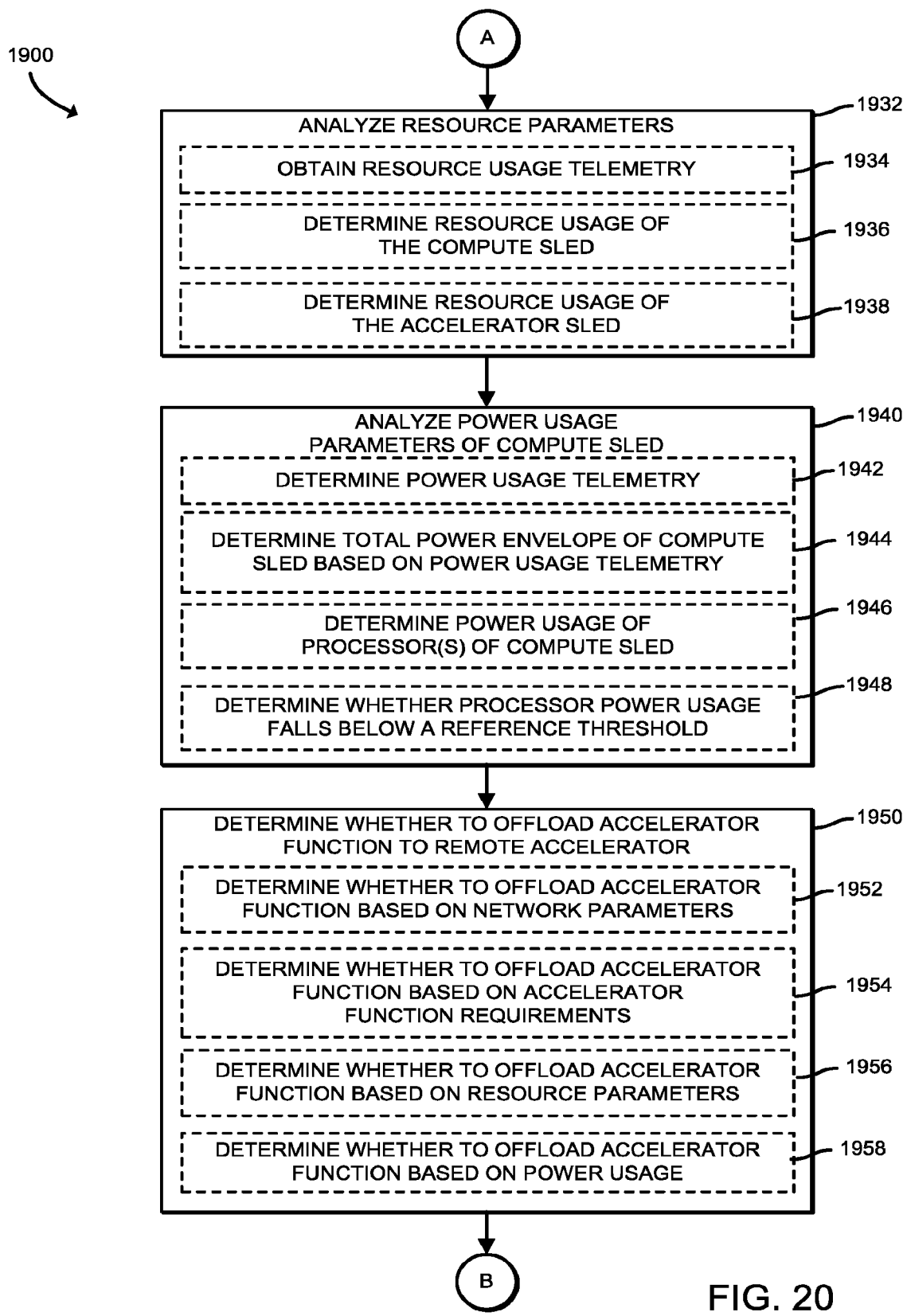

In block 1932 of FIG. 20, the compute sled 1602 obtains or receives resource usage telemetry, which may be embodied as any type of data indicative of resource utilization of resources of the compute sled 1602 itself and/or one or more accelerator sleds 1610, 1612. In some embodiments, the resources usage telemetry is stored in the accelerator resource data 1806, which may be accessed on demand by the compute sled 1602. The compute sled 1602 may obtain or otherwise determine the resource usage telemetry using any suitable mechanism. For example, the compute sled 1602 may receive resource usage telemetry indicative of the resource usage of various resources of the compute sled 1602 from various hardware monitors or other data monitors located on the compute sled 1602. Additionally, the compute sled 1602 may receive resource usage telemetry indicative of the resource usage of various resources of one or more accelerator sleds 1610, 1612 from the orchestrator server 1622 or directly from the corresponding accelerator sled 1610, 1612 as discussed above.

In block 1936, the compute sled 1602 may determine the resource usage of various resources of the compute sled 1602 based on the resource usage telemetry (e.g., the accelerator resource data 1806). For example, in the illustrative embodiment, the compute sled 1602 may analyze the accelerator resource data 1806 to determine a level of usage of the local accelerator 1652, the local NIC 1650, and/or one or more processors 1704 of the compute sled 1602. That is, the compute sled 1602 may determine, for example, whether the local accelerator 1652, the local NIC 1650, and/or the processors 1704 have excess capacity to execute the function. As discussed in more detail below, if the local accelerator 1652 has excess capacity, the compute sled 1602 may determine to assign the function to the local accelerator 1652.

Similarly, in block 1938, the compute sled 1602 may determine the resource usage of various resources of the accelerator sled(s) 1610, 1612 based on the resource usage telemetry (e.g., the accelerator resource data 1806). For example, in the illustrative embodiment, the compute sled 1602 may analyze the accelerator resource data 1806 to determine a level of usage of the remote accelerators 1632, the NICs 1638, the controllers 1636, and/or other resources of the accelerator sleds 1610, 1612. That is, the compute sled 1602 may determine, for example, whether the remote accelerators 1632 have excess capacity to execute the function. As discussed in more detail below, if one or more remote accelerators 1632 have excess capacity, the compute sled 1602 may determine to offload the function to the one or more remote accelerators 1632.

In block 1940, the compute sled 1602 analyzes the power usage parameters of various resources of the compute sled 1602. To do so, in block 1942, the compute sled determines the power usage telemetry data of the relevant resources. For example, the compute sled 1602 may receive power usage data from various hardware monitors or other data gatherers of the compute sled 1602. In block 1944, the compute sled 1602 determines a total power envelope of the compute sled based on the power usage telemetry. The total power envelope may be indicative of the total power usage, as well a maximum power usage, of the compute sled 1602. In block 1946, the compute sled 1602 may determine the present power usage of the processor(s) 1704 based on the power usage telemetry and determine, in block 1948, whether the present power usage of the processor(s) 1704 falls below a reference threshold. For example, the compute sled 1602 may determine whether the magnitude of the present power usage of the processor(s) 1704 is below a reference value and/or whether the percentage of the present power usage of the processor(s) 1704 of the total power envelope of the compute sled, as determined in block 1944, is below a reference percentage value.

After the compute sled 1602 has analyzed the network parameters in block 1914, the accelerated function requirements in block 1924, the resource parameters in block 1932, and the power usage parameters in block 1940, the method 1900 advances to block 1950. In block 1950, the compute sled 1602 determines whether to offload the accelerator function to one or more remote accelerators 1632. For example, in block 1952, the compute sled 1602 may determine to offload the accelerator function to the remote accelerator 1632 based on the network parameters. That is, the compute sled 1602 may determine to offload the accelerator function to a remote accelerator 1632 if the bandwidth saturation of the network 1606 is low or below a reference threshold. Additionally or alternatively, the compute sled 1602 determine to offload the accelerator function to a remote accelerator 1632 if the bandwidth saturation of the NIC 1650 and the NIC 1638 of the receiving accelerator sled 1610, 1612 is low or below a reference threshold. In those cases in which multiple accelerator sleds 1610, 1612 are available to accelerate the function, the compute sled 1602 may offload the accelerator function to an accelerator sled 1610, 1612 having a non-saturated NIC 1638, even though the bandwidth of a NIC 1638 of another accelerator sled 1610, 1612 is saturated.

Additionally or alternatively, the compute sled 1602 may determine whether to offload the accelerator function to a remote accelerator 1632 based on the accelerator function requirements in block 1954. For example, if the accelerator function requirements dictate certain performance parameters (e.g., a particular SLA, execution time, accuracy level, etc.) that can only be achieved by the remote accelerators 1632, the compute sled 1602 may determine to offload the accelerator function to one or more remote accelerators 1632. Conversely, if the accelerator function requirements dictate memory coherency, the compute sled 1602 may determine to assign or offload the accelerator function to the local accelerator 1652.

Additionally or alternatively, the compute sled 1602 may determine whether to offload the accelerator function to a remote accelerator 1632 based on the determined resource parameters in block 1956. For example, if the compute sled 1602 determines that the present workload of the remote accelerators 1632 is heavy, the compute sled 1602 may determine to assign the accelerator function to the local accelerator 1652. Similarly, if the compute sled 1602 determines that the present workload of the local accelerator 1652 and/or processors 1704 is heavy, the compute sled 1602 may determine to offload the accelerator function to one or more remote accelerators 1632.

Additionally or alternatively, the compute sled 1602 may determine whether to offload the accelerator function to a remote accelerator 1632 based on the determined power usage of the resources of the compute sled 1602 in block 1958. For example, if the compute sled 1602 determines that the present power usage of the processor(s) 1704 is low, which would allow the increasing of the power envelope of the local accelerator 1652, the compute sled 1602 may determine to assign the accelerator function to the local accelerator 1652 and, in some cases, increase its power envelope to improve/increase the processing of the function.

It should be appreciated that the compute sled 1602 may consider each of the network parameters, the accelerator function requirements, the resource usage parameters, and the power usage parameters as factors in determining whether to offload the accelerator function to the remote accelerator(s) 1632 or to assign the accelerator function to the local accelerator 1652. Of course, in some embodiments, the compute sled 1602 may prioritize some factors and/or apply different weighting values to the various factors. For example, assuming the local accelerator 1652 can satisfy the accelerator function requirements, the compute sled 1602 may elect to assign the accelerator function to the local accelerator 1652 even though the network saturation level is low if the power usage parameters indicate that power envelope of the local accelerator 1652 can be increased. In another embodiment, the compute sled 1602 may elect to always offload the accelerator function to a remote accelerator 1632 if the bandwidth saturation of the network 1606 and/or the NIC 1638 is below a threshold level. In other embodiments, the accelerator function requirements (e.g., an associated SLA) may have priority over all other factors such that the determination of where to assign the accelerator function is based on which of the accelerators 1632, 1652 can achieve the accelerator function requirements the best. In yet other embodiments, the compute sled 1602 may treat each factor equally.

Figure 21:
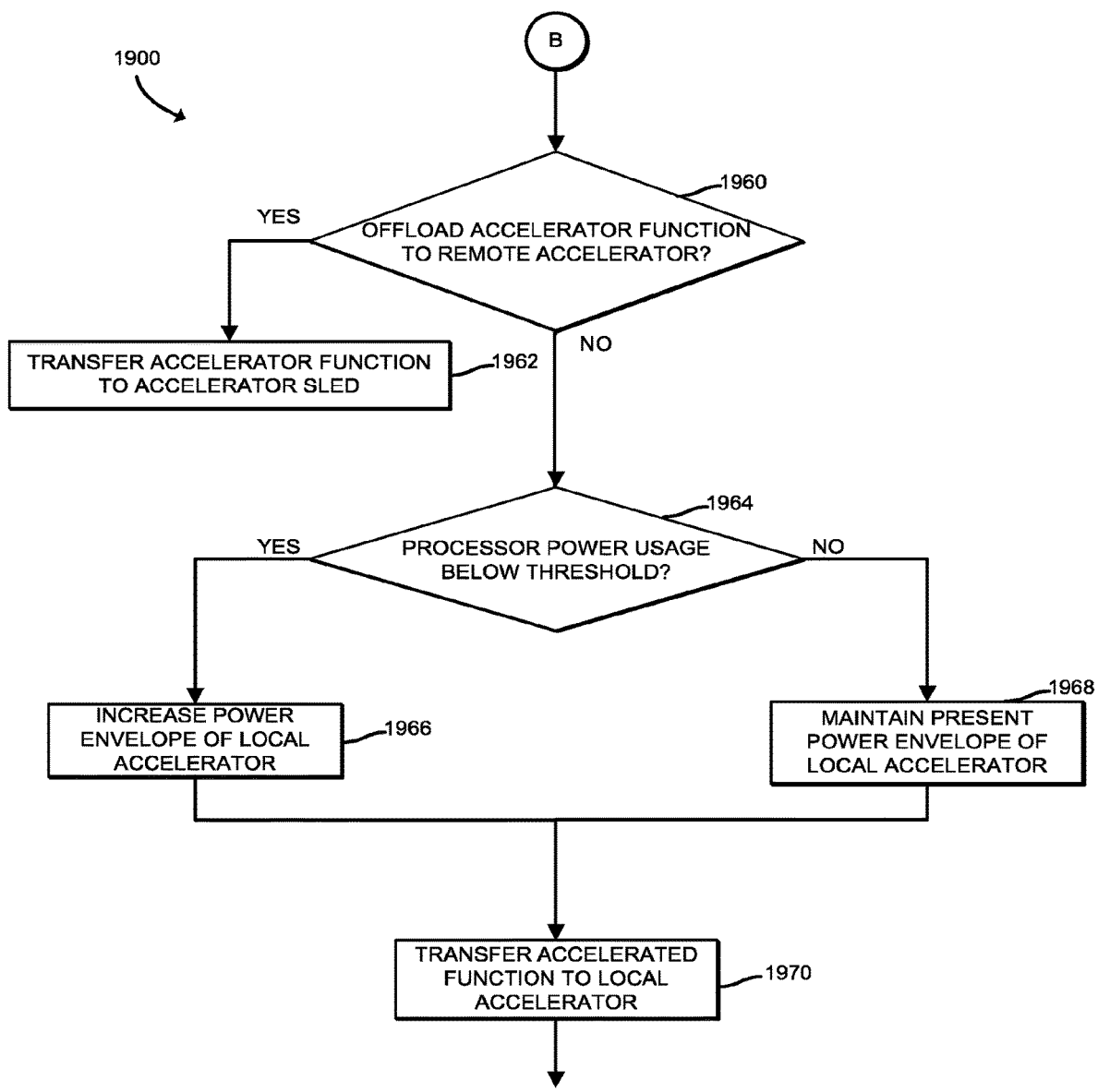

Regardless of the weighting applied to the various factors, the compute sled 1602 determines whether the decision is to offload the accelerator function to one or more remote accelerators 1632 in block 1960 of FIG. 21. If so, the compute sled 1602 transfers the accelerator function to one or more remote accelerators 1632 in block 1962 for execution. The remote accelerators 1632 may execute the function and return any result as normal. If, however, the compute sled determines to not offload the accelerator function to a remote accelerator 1632 in block 1960, the method 1900 advances to block 1964. In block 1964, the compute sled 1602 determines whether the power usage of the processor(s) 1704 is below a reference threshold such that the power envelope of the local accelerator 1652 may be increased. If so, the method 1900 advances to block 1966 in which the compute sled 1602 increases the power envelope of the local accelerator 1652. Depending on the type of accelerator 1652, the power envelope of the local accelerator 1652 may be increased in different ways. For example, in some embodiments, the maximum power supplied to the local accelerator 1652 may be increased. In other embodiments, a supply voltage of the local accelerator 1652 may be increased. The magnitude of the increase in the power envelope may be based on any one or more criteria. For example, the magnitude of the increase may be based on the particular operational characteristics of the local accelerator 1652, the accelerator function requirements, the power usage of the processor(s) 1704, and/or other criteria.

Referring back to block 1964, if the power usage of the processor(s) 1704 is not below the reference threshold, the method 1900 advances to block 1968. In block 1968, the present power envelope of the local accelerator 1652 is maintained at its present level. That is, the compute sled 1602 does not increase the power envelop of the local accelerator 1652. Regardless of whether the power envelope of the local accelerator 1652 is increased or not, the method 1900 subsequently advances to block 1970 in which the compute sled 1602 transfers the accelerator function to the local accelerator 1652 for execution. Additionally, in some embodiments, the compute sled 1602 may transfer the accelerator function, or portions thereof, to other "local" accelerators 1652 of other compute sleds 1602. For example, if the compute sled 1602 determines to not offload the accelerator function to the remote accelerator(s) 1632, the compute sled 1602 may transfer the accelerator function (or portions thereof) to one or more local accelerators 1652 of other compute sleds in the same rack as the compute sled 1602. Regardless, the execution of the method 1900 allows the compute sled 1602 to dynamically assign accelerator functions to local or remote accelerators based on various criteria to improve or increase the quality of execution of the accelerator function.

EXAMPLES

Illustrative examples of the technologies disclosed herein are provided below. An embodiment of the technologies may include any one or more, and any combination of, the examples described below.

Example 1 includes a compute sled for accelerating a function, the compute sled comprising a compute engine; a network interface controller to communicate with a remote accelerator of an accelerator sled over a network, wherein the network interface controller comprises a local accelerator, wherein the network interface controller is to receive a function to accelerate from the compute engine; obtain network telemetry data indicative of a level of bandwidth saturation of the network; determine whether to accelerate a function managed by the compute sled; determine, in response to a determination to accelerate the function, whether to offload the function to the remote accelerator of the accelerator sled based on the telemetry data; and assign, in response a determination not to offload the function to the remote accelerator, the function to the local accelerator.

Example 2 includes the subject matter of Example 1, and wherein to obtain the network telemetry data comprises to receive, from an orchestrator server, the network telemetry data.

Example 3 includes the subject matter of any of Examples 1 and 2, and wherein the network telemetry data is indicative of a level of bandwidth saturation of the network interface controller of the compute sled.

Example 4 includes the subject matter of any of Examples 1-3, and wherein the network telemetry data is indicative of a level of bandwidth saturation of a network interface controller of the accelerator sled.

Example 5 includes the subject matter of any of Examples 1-4, and wherein to determine whether to accelerate the function comprises to determine requirements of the function, wherein the requirements define parameters to be satisfied during execution of the function; and determine whether to accelerate the function based on the requirements of the function.

Example 6 includes the subject matter of any of Examples 1-5, and wherein to determine whether to accelerate the function comprises to determine metadata associated with the function, wherein the metadata comprises an indication whether the function is to be accelerated; and determine whether to accelerate the function based on the metadata.

Example 7 includes the subject matter of any of Examples 1-6, and wherein to determine whether to accelerate the function comprises to determine a level of available compute resources of the compute sled to execute the function; and determine whether to accelerate the function based on the a level of available compute resources of the compute sled.

Example 8 includes the subject matter of any of Examples 1-7, and wherein to determine whether to offload the function to the remote accelerator comprises to compare the telemetry data to a threshold; and wherein the network interface controller is further to offload the function to the remote accelerator in response to a determination that the telemetry data satisfies a reference relationship with the threshold.

Example 9 includes the subject matter of any of Examples 1-8, and wherein the local accelerator comprises a field programmable gate array (FPGA).

Example 10 includes the subject matter of any of Examples 1-9, and wherein to assign the function to the local accelerator comprises to load a kernel into the FPGA.

Example 11 includes the subject matter of any of Examples 1-10, and wherein the network interface controller is further to determine requirements of the function, wherein the requirements define parameters to be satisfied during execution of the function, and wherein to determine whether to offload the function comprises to determine whether to offload the function to the remote accelerator based on the telemetry data and the requirements of the function.

Example 12 includes the subject matter of any of Examples 1-11, and wherein to determine the requirements of the function comprises to determine memory requirements of the function.

Example 13 includes the subject matter of any of Examples 1-12, and wherein to determine the memory requirements of the function comprises to determine whether the function requires memory coherency, and wherein to assign the function to the local accelerator comprises to assign the function to the local accelerator in response to a determination that the function requires memory coherency.

Example 14 includes the subject matter of any of Examples 1-13, and wherein to determine the requirements of the function comprises to determine a service level agreement (SLA) associated with the function, and wherein to determine whether to offload the function comprises to determine whether to offload the function to the remote accelerator based on whether the SLA can be satisfied by remote accelerator during execution of the function.

Example 15 includes the subject matter of any of Examples 1-14, and wherein the network interface controller is further to determine a resource usage of the compute sled, wherein the resource usage is indicative of a level of usage of resources of the compute sled, and wherein to determine whether to offload the function comprises to determine whether to offload the function to the remote accelerator based on the telemetry data and the resource usage of the compute sled.

Example 16 includes the subject matter of any of Examples 1-15, and wherein the network interface controller is further to determine a resource usage of the accelerator sled, wherein the resource usage is indicative of a level of usage of resources of the accelerator sled, and wherein to determine whether to offload the function comprises to determine whether to offload the function to the remote accelerator based on the telemetry data and the resource usage of the accelerator sled.

Example 17 includes the subject matter of any of Examples 1-16, and wherein the network interface controller is further to determine a present power envelope of the compute sled, wherein the present power envelope is indicative of an amount of power presently used by the compute sled of a total power envelope available to the compute sled, and wherein to determine whether to offload the function comprises to determine whether to offload the function to the remote accelerator based on the telemetry data and the present power envelope of the compute sled.

Example 18 includes the subject matter of any of Examples 1-17, and wherein to determine the present power envelope of the compute sled comprises to determine a present power usage of a processor of the compute sled, and wherein to determine whether to offload the function comprises to determine whether to offload the function to the remote accelerator based on whether the present power usage of the processor satisfies a reference relationship with a reference power threshold value.

Example 19 includes the subject matter of any of Examples 1-18, and wherein to assign the function to the local accelerator comprises to assign the function to the local accelerator in response to a determination that the present power usage of the processor is less than the reference power threshold value.

Example 20 includes the subject matter of any of Examples 1-19, and further including a processor, and wherein the network interface controller is further to determine a present power usage of the processor, and wherein to assign the function to the local accelerator comprises to increase a power envelope of the local accelerator in response to a determination that the present power usage of the processor is less than a reference power threshold value.

Example 21 includes a method for accelerating a function by a compute sled of a data center, the method comprising obtaining, by the compute sled, network telemetry data indicative of a level of bandwidth saturation of a network through which the compute sled is communicatively coupled to an accelerator sled; determining, by the compute sled, whether to accelerate a function managed by the compute sled; determining, by the compute sled and in response to a determination to accelerate the function, whether to offload the function to a remote accelerator of the accelerator sled based on the telemetry data; and assigning, in response a determination not to offload the function to the remote accelerator, the function to a local accelerator of a network interface controller of the compute sled.

Example 22 includes the subject matter of Example 21, and wherein obtaining the network telemetry data comprises receiving, by the compute sled and from an orchestrator server of the data center, the network telemetry data.

Example 23 includes the subject matter of any of Examples 21 and 22, and wherein the network telemetry data is indicative of a level of bandwidth saturation of the network interface controller of the compute sled.

Example 24 includes the subject matter of any of Examples 21-23, and wherein the network telemetry data is indicative of a level of bandwidth saturation of a network interface controller of the accelerator sled.

Example 25 includes the subject matter of any of Examples 21-24, and wherein determining whether to accelerate the function comprises determining, by the compute sled, requirements of the function, wherein the requirements define parameters to be satisfied during execution of the function; and determining, by the compute sled, whether to accelerate the function based on the requirements of the function.

Example 26 includes the subject matter of any of Examples 21-25, and wherein determining whether to accelerate the function comprises determining, by the compute sled, metadata associated with the function, wherein the metadata comprises an indication whether the function is to be accelerated; and determining, by the compute sled, whether to accelerate the function based on the metadata.

Example 27 includes the subject matter of any of Examples 21-26, and wherein determining whether to accelerate the function comprises determining, by the compute sled, a level of available compute resources of the compute sled to execute the function; and determining, by the compute sled, whether to accelerate the function based on the a level of available compute resources of the compute sled.

Example 28 includes the subject matter of any of Examples 21-27, and wherein determining whether to offload the function to the remote accelerator comprises comparing, by the compute sled, the telemetry data to a threshold; and further comprising offloading, by the compute sled, the function to the remote accelerator of the accelerator sled in response to a determination that the telemetry data satisfies a reference relationship with the threshold.

Example 29 includes the subject matter of any of Examples 21-28, and wherein the accelerator of the network interface controller comprises a field programmable gate array (FPGA).

Example 30 includes the subject matter of any of Examples 21-29, and wherein assigning the function to the accelerator comprises loading, by the compute sled, a kernel into the FPGA.

Example 31 includes the subject matter of any of Examples 21-30, and further including determining, by the compute sled, requirements of the function, wherein the requirements define parameters to be satisfied during execution of the function, and wherein determining whether to offload the function comprises determining, by the compute sled, whether to offload the function to the remote accelerator based on the telemetry data and the requirements of the function.

Example 32 includes the subject matter of any of Examples 21-31, and wherein determining the requirements of the function comprises determining, by the compute sled, memory requirements of the function.

Example 33 includes the subject matter of any of Examples 21-32, and wherein determining the memory requirements of the function comprises determining whether the function requires memory coherency, and wherein assigning the function to the local accelerator comprises assigning the function to the local accelerator in response to a determination that the function requires memory coherency.

Example 34 includes the subject matter of any of Examples 21-33, and wherein determining the requirements of the function comprises determining, by the compute sled, a service level agreement (SLA) associated with the function, and wherein determining whether to offload the function comprises determining whether to offload the function to the remote accelerator based on whether the SLA can be satisfied by remote accelerator during execution of the function.

Example 35 includes the subject matter of any of Examples 21-34, and further including determining, by the compute device, a resource usage of the compute sled, wherein the resource usage is indicative of a level of usage of resources of the compute sled, and wherein determining whether to offload the function comprises determining, by the compute sled, whether to offload the function to the remote accelerator based on the telemetry data and the resource usage of the compute sled.

Example 36 includes the subject matter of any of Examples 21-35, and further including determining, by the compute device, a resource usage of the accelerator sled, wherein the resource usage is indicative of a level of usage of resources of the accelerator sled, and wherein determining whether to offload the function comprises determining, by the compute sled, whether to offload the function to the remote accelerator based on the telemetry data and the resource usage of the accelerator sled.

Example 37 includes the subject matter of any of Examples 21-36, and further including determining, by the compute device, a present power envelope of the compute sled, wherein the present power envelope is indicative of an amount of power presently used by the compute sled of a total power envelope available to the compute sled, and wherein determining whether to offload the function comprises determining, by the compute sled, whether to offload the function to the remote accelerator based on the telemetry data and the present power envelope of the compute sled.

Example 38 includes the subject matter of any of Examples 21-37, and wherein determining the present power envelope of the compute sled comprises determining a present power usage of a processor of the compute sled, and wherein determining whether to offload the function comprises determining, by the compute sled, whether to offload the function to the remote accelerator based on whether the present power usage of the processor satisfies a reference relationship with a reference power threshold value.

Example 39 includes the subject matter of any of Examples 21-38, and wherein assigning the function to the local accelerator of the network interface controller of the compute sled comprises assigning, by the compute sled, the function to the local accelerator in response to a determination that the present power usage of the processor is less than the reference power threshold value.

Example 40 includes the subject matter of any of Examples 21-39, and further including determining a present power usage of a processor of the compute sled, and wherein assigning the function to the local accelerator of the network interface controller of the compute sled comprises increasing a power envelope of the local accelerator in response to a determination that the present power usage of the processor is less than a reference power threshold value.

Example 41 includes one or more machine-readable storage media comprising a plurality of instructions stored thereon that, when executed, causes a compute sled to perform the method of any of Examples 21-40.

Example 42 includes a compute sled comprising means for performing the method of any of Examples 21-40.

The invention claimed is:

1. One or more non-transitory machine-readable storage media comprising a plurality of instructions stored thereon that, when executed, causes a compute device to:
obtain network telemetry data to include physical location information for a plurality of accelerators; and
offload acceleration of a function to a remote accelerator included in the plurality of accelerators in response to a determination to offload acceleration of the function to the remote accelerator based on the network telemetry data.

2. The one or more non-transitory machine-readable storage media of claim 1, wherein the network telemetry data to also include an indication of a level of bandwidth saturation of (i) a network interface controller at the compute device or (ii) a second network interface controller at an accelerator device that includes the remote accelerator.

3. The one or more non-transitory machine-readable storage media of claim 1, wherein the plurality of instructions, when executed, further cause the compute device to:
determine requirements of the function, wherein the requirements define parameters to be satisfied during execution of the function, and
wherein the determination to offload acceleration of the function is based on the network telemetry data and the requirements of the function.

4. The one or more non-transitory machine-readable storage media of claim 3, wherein to determine the requirements of the function comprises to determine whether the function requires memory coherency, and
wherein the determination to offload acceleration of the function to the remote accelerator is also based on a determination that the function does not require memory coherency.

5. The one or more non-transitory machine-readable storage media of claim 1, wherein the plurality of instructions, when executed, further cause the compute device to:
determine a resource usage at an accelerator device that includes the remote accelerator, wherein the resource usage is indicative of a level of usage of resources at the accelerator device, and wherein the determination to offload acceleration of the function to the remote accelerator is based on the network telemetry data and the resource usage of the accelerator device.

6. The one or more non-transitory machine-readable storage media of claim 1, wherein the plurality of instructions, when executed, further cause the compute device to:
   determine requirements of the function, wherein the requirements define parameters to be satisfied during execution of the function, and
   wherein the determination to offload acceleration of the function to the remote accelerator is based on the network telemetry data and the requirements of the function.

7. The one or more non-transitory machine-readable storage media of claim 1, wherein the plurality of instructions, when executed, further cause the compute device to:
   determine a resource usage of the compute device, wherein the resource usage is indicative of a level of usage of resources at the compute device, and
   wherein the determination to offload acceleration of the function to the remote accelerator is based on the network telemetry data and the resource usage of the compute device.

8. The one or more non-transitory machine-readable storage media of claim 1, wherein the physical location information for the plurality of accelerators indicates a spatial relationship of the plurality of accelerators within a data center.

9. An apparatus comprising:
   a network interface controller to communicate with a remote accelerator over a network, wherein the network interface controller is to:
   receive a function to accelerate from a processor of a compute device;
   obtain network telemetry data to include physical location information for a plurality of accelerators; and
   offload acceleration of a function to a remote accelerator included in the plurality of accelerators in response to a determination to offload acceleration of the function to the remote accelerator based on the network telemetry data.

10. The apparatus of claim 9, wherein the network telemetry data to also include an indication of a level of bandwidth saturation of (i) the network interface controller or (ii) a second network interface controller at an accelerator device that includes the remote accelerator.

11. The apparatus of claim 9, wherein the network interface controller is further to:
    determine requirements of the function, wherein the requirements define parameters to be satisfied during execution of the function, and
    wherein the determination to offload acceleration of the function is based on the network telemetry data and the requirements of the function.

12. The apparatus of claim 11, wherein to determine the requirements of the function comprises to determine whether the function requires memory coherency, and
    wherein the determination to offload acceleration of the function to the remote accelerator is also based on a determination that the function does not require memory coherency.

13. The apparatus of claim 9, wherein the network interface controller is further to:
    determine a resource usage at an accelerator device that includes the remote accelerator, wherein the resource usage is indicative of a level of usage of resources at the accelerator device, and
    wherein the determination to offload acceleration of the function to the remote accelerator is based on the network telemetry data and the resource usage at the accelerator device.

14. The apparatus of claim 9, wherein the network interface controller is further to:
    determine a resource usage of the compute device, wherein the resource usage is indicative of a level of usage of resources at the compute device, and
    wherein the determination to offload acceleration of the function to the remote accelerator is based on the network telemetry data and the resource usage of the compute device.

15. The apparatus of claim 9, wherein the physical location information for the plurality of accelerators indicates a spatial relationship of the plurality of accelerators within a data center.

16. A method comprising:
    obtaining, by a compute device, network telemetry data that includes physical location information for a plurality of accelerators; and
    offloading acceleration of a function to a remote accelerator included in the plurality of accelerators in response to a determination to offload acceleration of the function to the remote accelerator based on the network telemetry data.

17. The method of claim 16, wherein the network telemetry data also including an indication of a level of bandwidth saturation of (i) a network interface controller at the compute device or (ii) a second network interface controller at an accelerator device that includes the remote accelerator.

18. The method of claim 16, further comprising:
    determining requirements of the function, wherein the requirements define parameters to be satisfied during execution of the function, and
    wherein the determination to offload acceleration of the function is based on the network telemetry data and the requirements of the function.

19. The method of claim 18, wherein determining the requirements of the function comprises determining whether the function requires memory coherency, and
    wherein the determination to offload acceleration of the function to the remote accelerator is also based on a determination that the function does not require memory coherency.

20. The method of claim 16, further comprising:
    determining a resource usage of the compute device, wherein the resource usage is indicative of a level of usage of resources at the compute device, and
    wherein the determination to offload acceleration of the function to the remote accelerator is based on the network telemetry data and the resource usage of the compute device.

21. The method of claim 16, further comprising:
    determining resource usage at an accelerator device that includes the remote accelerator, wherein the resource usage is indicative of a level of usage of resources at the accelerator device, and
    wherein the determination to offload acceleration of the function to the remote accelerator is also based on the network telemetry data and the resource usage of the accelerator device.

22. The method of claim 16, wherein the physical location information for the plurality of accelerators indicates a spatial relationship of the plurality of accelerators within a data center.

* * * * *